United States Patent
Lee

(10) Patent No.: US 8,710,756 B2
(45) Date of Patent: Apr. 29, 2014

(54) ACTIVE CONSTANT POWER SUPPLY APPARATUS

(75) Inventor: Dong-Won Lee, Kyungki-do (KR)

(73) Assignee: Ecolite Technology Co., Ltd., Seoul (KR)

( * ) Notice: Subject to any disclaimer, the term of this patent is extended or adjusted under 35 U.S.C. 154(b) by 218 days.

(21) Appl. No.: 13/255,733

(22) PCT Filed: Mar. 8, 2010

(86) PCT No.: PCT/KR2010/001421
§ 371 (c)(1),
(2), (4) Date: Nov. 17, 2011

(87) PCT Pub. No.: WO2010/104297
PCT Pub. Date: Sep. 16, 2010

(65) Prior Publication Data
US 2012/0119650 A1    May 17, 2012

(30) Foreign Application Priority Data
Mar. 9, 2009    (KR) .................. 10-2009-0019545

(51) Int. Cl.
*H05B 37/02*    (2006.01)
*H05B 39/04*    (2006.01)
*H05B 41/36*    (2006.01)

(52) U.S. Cl.
USPC .................................. 315/210; 315/297

(58) Field of Classification Search
None
See application file for complete search history.

(56) References Cited

U.S. PATENT DOCUMENTS

| 7,880,400 B2 * | 2/2011 | Zhou et al. .......... 315/247 |
| 2007/0029987 A1 | 2/2007 | Li |
| 2008/0284346 A1 | 11/2008 | Lee |

FOREIGN PATENT DOCUMENTS

| JP | 2007-005450 | 1/2007 |
| JP | 2008-235530 | 10/2008 |
| KR | 10-0753665 | 8/2007 |

* cited by examiner

*Primary Examiner* — Douglas W Owens
*Assistant Examiner* — Dedei K Hammond
(74) *Attorney, Agent, or Firm* — IPLA P.A.; James E. Bame

(57) ABSTRACT

Disclosed is an active constant power supply apparatus, which rectifies power having various intensities and frequencies without using a high capacity condenser for a smoothing circuit which degrades the power factor of a circuit, and supplies constant power to a load. The active constant power supply apparatus includes an AC power supplier for supplying AC power; a rectifying circuit which receives AC power from the AC power supply unit and rectifies the received power; a driving coil connected in series to the load receiving power from the rectifying circuit; a power switch which switches the current passing through the driving coil and the load on/off; a pulse-type driving signal generator connected to a gate terminal of the power switch to control the switching on/off operation of the power switch; a turn-off decider which generates a turn-off signal when the current flowing along the driving coil has a value higher than the designed value, so as to turn off the power switch; and a pulse width controller which measures the control period ranging from the switch-on time of the driving signal generator to the switch-off time of the turn-off decider, and controls the driving pulse width of the driving signal generator such that the driving pulse width coincides with the control period.

12 Claims, 28 Drawing Sheets

FIG. 4

| Rectifying Voltage (V) | 300uH | | | 600uH | | |
|---|---|---|---|---|---|---|
| | Switch turn-on time | Coil discharge end time | Discharge term | Switch turn-on time | Coil discharge end time | Discharge term |
| 110 | 6.05 / *5.31* | 12.97 / *1.52* | 6.92 | 12.30 / *5.42* | 26.00 / *1.58* | 13.70 |
| 170 | 2.99 / *2.62* | 10.05 / *1.18* | 7.06 | 6.03 / *2.66* | 20.00 / *1.21* | 13.97 |
| 250 | 1.80 / *1.58* | 8.98 / *1.05* | 7.18 | 3.61 / *1.59* | 17.50 / *1.06* | 13.89 |
| 370 | 1.14 / *1.00* | 8.55 / *1.00* | 7.41 | 2.27 / *1.00* | 16.50 / *1.00* | 14.23 |

Unit (us)

\ / Operation frequency of width adjustment decider is increased.

FIG. 14
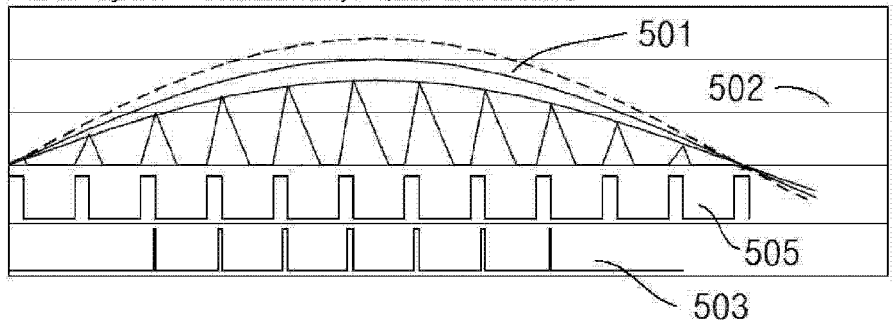
First Cycle - Before Adj. (narrow width)
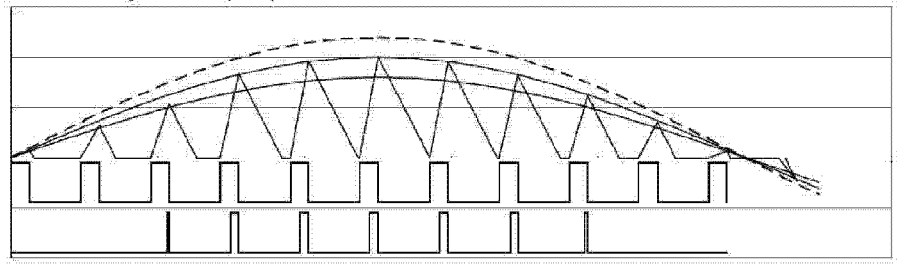
Second Cycle - proper width
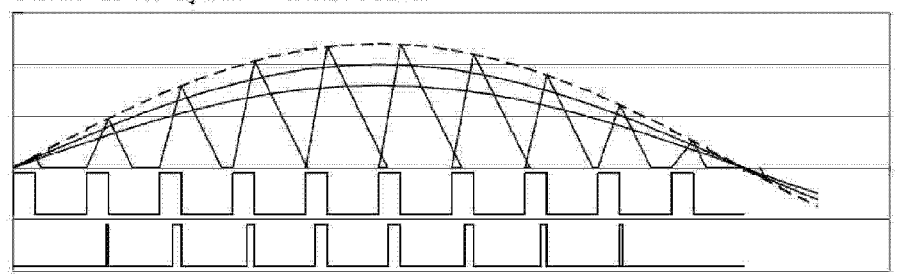
After 3'rd Cycle - wide width
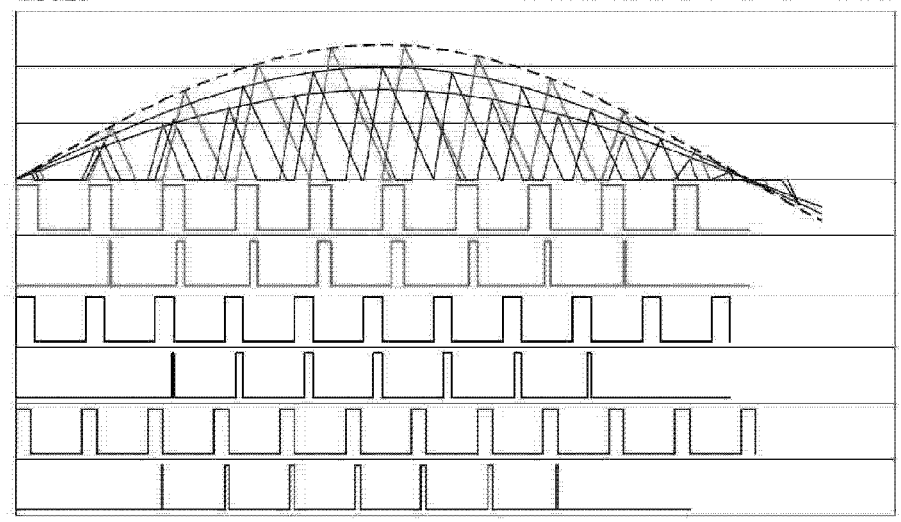
Total          Fixed Turn-off Term Scheme FIG. 16
First Cycle - Long discharge term
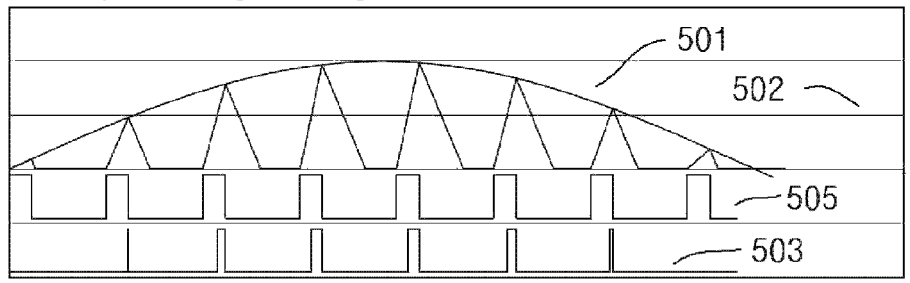
Second Cycle - Adjusted discharge term
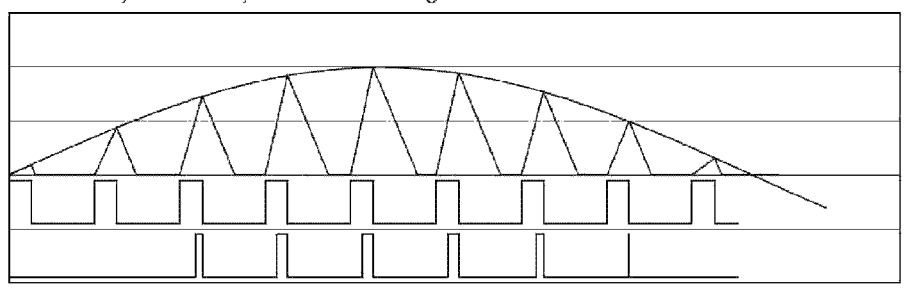
After 3'rd Cycle - Short discharge term
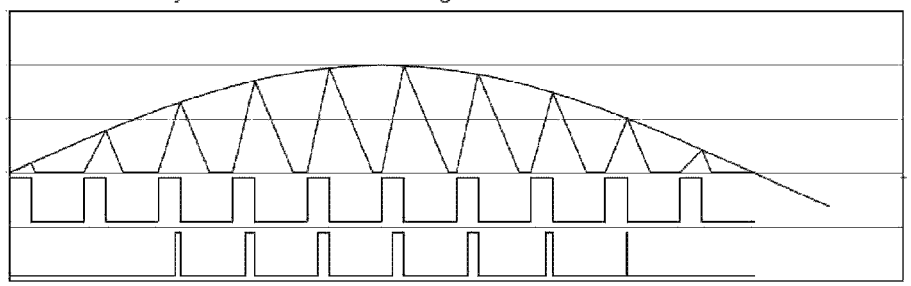
Total                                    Fixed Tern-on Term Scheme
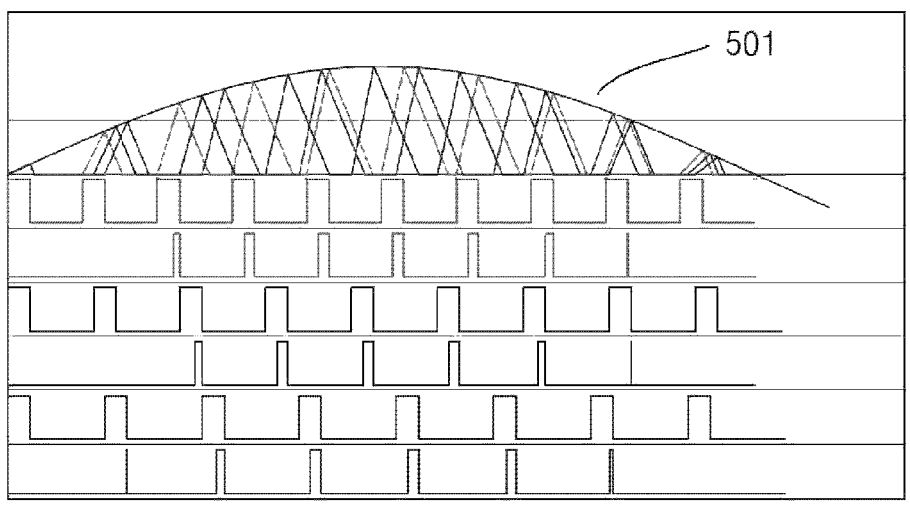

FIG. 18

| Item | Unit | Serial No | | | | | | |
|---|---|---|---|---|---|---|---|---|
| | | A016 | A029 | B025 | B024 | A012 | A036 |
| PF | | 0.975 | 0.989 | 0.993 | 0.992 | 0.982 | 0.994 |
| THD | % | 11.7 | 12.4 | 8.7 | 13.2 | 18.2 | 8.5 |
| First Phase Angle | Degree | 169.1 | 175.4 | 178.3 | 178.4 | 176.4 | 176.2 |
| Rectifying Voltage | V | 370 | 250 | 170 | 110 | 370 | 370 |
| Load Voltage | V | 50.3 | 50.3 | 24.2 | 24.2 | 50.3 | 50.3 |
| Pulse width | us | 2.4 | 3.8 | 2.7 | 4.45 | 2.4 | 2.4 |
| L1 | uH | 320 | 320 | 168 | 168 | 320 | 640 |
| L(LPF) | mH | 2 | 2 | 2 | 2 | 1 | 1 |
| C(LPF) | uF | 0.3 | 0.3 | 0.3 | 0.3 | 0.1 | 0.1 |
| LED Current | mA | 20.5 | 20.6 | 20.45 | 20.14 | 20.4 | 20.6 |
| Switch Current | A | 2.37 | 2.38 | 2.31 | 2.33 | 2.4 | 1.21 |

FIG. 19

| IEC 1000-3-2 Class C | | Simulation test serial No | | | | | |
|---|---|---|---|---|---|---|---|
| Order | Reference (%) | A016 | A029 | B025 | B024 | A012 | A036 |
| 1 | 100 | 100.0 | 100.0 | 100.0 | 100.0 | 100.0 | 100.0 |
| 2 | 2 | 1.0 | 0.5 | 0.2 | 0.0 | 0.1 | 0.2 |
| 3 | 30xPF | 6.3 | 10.0 | 6.5 | 10.9 | 6.6 | 5.7 |
| 5 | 10 | 3.9 | 4.9 | 3.5 | 5.7 | 3.3 | 3.9 |
| 7 | 7 | 2.9 | 3.3 | 2.4 | 3.3 | 2.9 | 2.0 |
| 9 | 5 | 2.6 | 0.2 | 0.3 | 1.0 | *9.9* | 2.0 |
| 11 | 3 | 2.7 | 2.7 | 2.8 | 2.5 | *12.4* | 1.1 |
| 13 | 3 | 1.8 | 0.6 | 0.7 | 0.2 | 0.6 | 0.9 |
| 15 | 3 | 0.8 | 0.2 | 0.6 | 0.1 | 0.5 | 0.6 |
| 17 | 3 | 1.1 | 0.5 | 0.5 | 0.5 | 0.6 | 0.9 |
| 19 | 3 | 0.3 | 0.6 | 0.5 | 0.6 | 2.2 | 2.1 |
| 21 | 3 | 1.0 | 0.2 | 0.6 | 0.8 | 2.5 | 2.5 |
| 23 | 3 | 0.8 | 0.4 | 0.3 | 0.3 | 0.2 | 0.2 |
| 25 | 3 | 0.7 | 0.3 | 0.3 | 0.4 | 0.2 | 0.4 |
| 27 | 3 | 0.8 | 0.3 | 0.2 | 0.2 | 0.3 | 0.2 |
| 29 | 3 | 0.9 | 0.6 | 0.4 | 0.0 | 1.2 | 0.6 |
| 31 | 3 | 0.5 | 0.1 | 0.4 | 0.1 | 1.2 | 0.2 |
| 33 | 3 | 0.2 | 0.1 | 0.2 | 0.2 | 0.3 | 0.7 |
| 35 | 3 | 0.4 | 0.3 | 0.5 | 0.2 | 0.2 | 0.2 |
| 37 | 3 | 0.3 | 0.7 | 0.2 | 0.2 | 0.0 | 0.4 |
| 39 | 3 | 0.2 | 0.2 | 0.3 | 0.2 | 1.0 | 0.5 |

FIG. 23

| Item | Unit | Simulation test serial No | | | | | | | | | |
|---|---|---|---|---|---|---|---|---|---|---|---|
| | | D002 | D003 | D004 | D005 | D006 | D007 | D008 | D009 | D010 |
| Rectifying Voltage | V | 100 | 111.1 | 125 | 142.9 | 150 | 166.7 | 200 | 250 | 333.3 |
| Load Voltage | (%) | 50.0 | 45.0 | 40.0 | 35.0 | 33.3 | 30.0 | 25.0 | 20.0 | 15.0 |
| Power Factor | | 0.946 | 0.956 | 0.965 | 0.977 | 0.980 | 0.980 | 0.988 | 0.987 | 0.991 |
| First phase angle | Deg | 179.6 | 179.5 | 179.1 | 178.8 | 178.7 | 178.1 | 177.3 | 175.5 | 174.8 |
| Pulse width | us | 4.48 | 3.83 | 2.98 | 2.41 | 2.24 | 1.92 | 1.55 | 1.12 | 1.5 |
| Effective current | mA | 18.4 | 19 | 17.7 | 17.8 | 17.9 | 17.6 | 18 | 17.8 | 21.9 |

VF(LED) = 50.3V at 20mA
100KHz, 2 switch drive, 10 LEDs / switch
L(LPF) = 1mH
C(LPF)= 0.1uF
L1 = 360uH, ( D010 = 720uH )

FIG. 24

| IEC 1000-3-2 Class C | | Simulation test serial No | | | | | | | | | |
|---|---|---|---|---|---|---|---|---|---|---|---|
| Order | Reference (%) | D002 | D003 | D004 | D005 | D006 | D007 | D008 | D009 | D010 |
| 1 | 100 | 100.0 | 100.0 | 100.0 | 100.0 | 100.0 | 100.0 | 100.0 | 100.0 | 100.0 |
| 2 | 2 | 0.2 | 0.5 | 0.5 | 0.4 | 0.6 | 0.3 | 0.8 | 0.5 | 0.6 |
| 3 | 30×PF | 32.7 | 28.4 | 25.2 | 19.4 | 17.6 | 17.6 | 11.3 | 11.2 | 5.5 |
| 5 | 10 | 7.0 | 10.1 | 8.5 | 8.2 | 6.4 | 6.5 | 7.9 | 4.2 | 5.2 |
| 7 | 7 | 0.7 | 2.7 | 1.6 | 2.2 | 4.7 | 5.1 | 2.5 | 4.6 | 2.9 |
| 9 | 5 | 6.7 | 0.8 | 4.1 | 3.2 | 3.4 | 2.6 | 1.4 | 2.2 | 1.9 |
| 11 | 3 | 0.7 | 1.2 | 1.7 | 2.4 | 3.2 | 0.1 | 2.8 | 2.5 | 1.7 |
| 13 | 3 | 0.5 | 2.4 | 0.6 | 3.6 | 2.0 | 1.5 | 1.2 | 1.7 | 1.6 |
| 15 | 3 | 0.6 | 1.4 | 2.0 | 0.7 | 0.5 | 0.9 | 1.7 | 1.4 | 0.2 |
| 17 | 3 | 1.5 | 1.6 | 0.6 | 0.3 | 1.0 | 1.0 | 1.0 | 0.9 | 0.7 |
| 19 | 3 | 0.5 | 1.4 | 1.3 | 0.3 | 0.6 | 1.2 | 0.5 | 1.4 | 1.8 |
| 21 | 3 | 0.6 | 0.1 | 1.1 | 0.9 | 1.1 | 0.3 | 0.5 | 0.4 | 0.1 |
| 23 | 3 | 1.5 | 0.4 | 0.7 | 0.1 | 0.3 | 0.3 | 0.3 | 0.8 | 0.2 |
| 25 | 3 | 0.5 | 0.2 | 0.3 | 0.7 | 0.3 | 0.1 | 0.7 | 0.7 | 0.3 |
| 27 | 3 | 1.0 | 0.4 | 0.4 | 0.3 | 0.4 | 0.5 | 0.2 | 0.5 | 0.8 |
| 29 | 3 | 0.2 | 0.4 | 0.6 | 0.6 | 0.4 | 0.6 | 0.6 | 0.3 | 0.4 |
| 31 | 3 | 0.6 | 0.4 | 0.6 | 0.2 | 0.4 | 0.2 | 0.3 | 0.8 | 0.2 |
| 33 | 3 | 0.8 | 0.2 | 0.4 | 0.3 | 0.2 | 0.5 | 0.2 | 0.6 | 0.2 |
| 35 | 3 | 0.5 | 0.2 | 1.0 | 0.3 | 0.2 | 0.7 | 0.3 | 0.3 | 0.2 |
| 37 | 3 | 0.6 | 0.2 | 0.2 | 0.2 | 0.3 | 0.8 | 0.1 | 0.3 | 0.2 |
| 39 | 3 | 0.7 | 0.5 | 0.4 | 0.4 | 0.4 | 0.7 | 0.8 | 0.5 | 0.3 |
| 3'rd Ref | 30×PF | 28.4 | 28.7 | 28.9 | 29.3 | 29.4 | 29.4 | 29.6 | 29.6 | 29.7 |
| THD | % | 34.3 | 30.5 | 27.3 | 20.1 | 20.1 | 19.9 | 14.8 | 14.2 | 9.4 |
| Load Voltage | % | 50.0 | 45.0 | 40.0 | 35.0 | 33.3 | 30.0 | 25.0 | 20.0 | 15 |

FIG. 25

| Load voltage (V) | Rectifying Voltage 370V | | Rectifying voltage 250V | |
|---|---|---|---|---|
| | Pulse width | Discharge end time | Pulse width | Discharge end time |
| 50.3 | 2.400 | *16.725* | 3.800 | *16.845* |
| 48 | 2.383 | 17.394 | 3.757 | 17.427 |
| 46 | 2.368 | 18.032 | 3.720 | 17.984 |
| 44 | 2.354 | 18.730 | 3.684 | 18.597 |
| 42 | 2.339 | 19.495 | 3.648 | 19.271 |
| 40 | 2.325 | 20.339 | 3.614 | 20.018 |
| 38 | 2.311 | 21.273 | 3.580 | 20.847 |
| 36 | 2.297 | 22.312 | 3.546 | 21.773 |
| 34 | 2.284 | 23.476 | 3.513 | 22.812 |
| 32 | 2.270 | 24.787 | 3.481 | 23.986 |
| 30 | 2.257 | 26.275 | 3.449 | 25.321 |
| 28 | 2.244 | 27.977 | 3.418 | 26.853 |
| 26 | 2.230 | 29.944 | 3.388 | 28.625 |
| 24.2 | 2.219 | 31.994 *(32.300)* | 3.361 | 30.475 *(33.000)* |
| 22 | 2.205 | 34.957 | 3.328 | 33.154 |
| 20 | 2.192 | 38.220 | 3.299 | 36.108 |
| 18 | 2.180 | 42.210 | 3.271 | 39.724 |
| 16 | 2.167 | 47.202 | 3.243 | 44.253 |
| 14 | 2.155 | 53.623 | 3.216 | 50.084 |
| 12.3 | 2.145 | 60.726 *(59.000)* | 3.193 | 56.539 *(59.200)* |
| 10 | 2.131 | 74.186 | 3.162 | 68.778 |
| 8 | 2.120 | 92.188 | 3.136 | 85.156 |
| 6 | 2.108 | 122.199 | 3.110 | 112.471 |
| 4 | 2.096 | 182.233 | 3.085 | 167.126 |

*Inclined number : measurement value of simula*   [ unit : us ]

ACTIVE CONSTANT POWER SUPPLY APPARATUS

BACKGROUND OF THE INVENTION

The present invention relates to an active constant power supply apparatus. More particularly, the present invention relates to an active constant power supply apparatus which can rectify power having various intensities and frequencies without using a high capacity condenser for a smoothing circuit which degrades the power factor of a circuit, and can supply constant power to a load.

The precise control for power supply is very important in various fields. In particular, since current of an LED (light emitting diode) is significantly varied even if voltage is slightly changed, the precise current control is required.

According to the related art, as shown in FIG. 1, AC power supplied from an AC power supplier 10 is converted into DC voltage by a rectifier 11 and a smoothing circuit Cd, and constant voltage is supplied to a load by a pulse width controller 20.

In addition, under the designed input voltage of the AC power supplier 10, the turn-on of a switch Q is performed by driving the switch Q using a switch driver 23 when an oscillator 21 sets an RS-flip-flop 22 and the turn-off of the switch Q is performed by resetting the RS-flip-flop 22 using a switch turn-off decider 24 when voltage applied to a current detection resistor R is higher than reference voltage ZD due to over-current supplied to the switch turn-off decider 24 through a leading edge blanker 25.

Further, the current flowing through the switch Q is consecutively increased from a turn-on point of the switch Q due to a coil L serving as a charged device. In addition, under the designed input current of the AC power supplier 10, if the switch Q is turned on, the current detection resistance R is set such that the switch Q can be turned off by the switch turn-off decider 24. If the switch turn-off decider 24 is not operated, the switch Q is turned off at the point corresponding to 80% to 90% of the oscillation period of the oscillator 21.

However, according to the related art, when the constant power is supplied to the load 12 by SMPS (Switching Mode Power Supply) scheme, a high voltage/capacitance condenser for the smoothing circuit Cd is required to stably supply power to the load 12 by smoothing the AC power.

Therefore, the power factor is lowered to the level of 0.4 to 0.5 due to the condenser. In order to improve the power factor to the level of 0.9, an additional circuit for improving the power factor must be provided.

In addition, the high voltage/capacitance condenser for the smoothing circuit Cd is very expensive and increases the size of the circuit so that the physical size of the constant power supply module may be enlarged.

SUMMARY OF THE INVENTION

The present invention has been made to solve the above problems occurring in the related art, and an object of the present invention is to provide an active constant power supply apparatus which can rectify power having various intensities and frequencies without using a high capacity condenser for a smoothing circuit which degrades the power factor of a circuit, and can stably supply effective constant power to a load.

In order to accomplish the above object, there is provided an active constant power supply apparatus for supplying constant power to a load. The active constant power supply apparatus includes an AC power supplier for supplying AC power; a rectifying circuit which receives the AC power from the AC power supplier and rectifies the received AC power; a driving coil connected in series to the load receiving power from the rectifying circuit; a power switch for switching on/off a current passing through the driving coil and the load; a free-wheeling diode, both ends of which are connected to an outer terminal and an input terminal of the load, respectively, so that the free-wheeling diode is connected to the load in parallel, the free-wheeling diode being installed such that the current flows from the output terminal of the load to the input terminal of the load to discharge the current charged in the driving coil to the load when the power switch is switched off; a pulse-type driving signal generator connected to a gate terminal of the power switch to control the switching on/off operation of the power switch; a turn-off decider which generates a turn-off signal when the current flowing along the driving coil has a value higher than a designed value, so as to switch off the power switch; and a pulse width controller which measures an adjustment term ranging from a switch-on time of the driving signal generator to a switch-off time of the turn-off decider in a unit of one cycle of a rectifying voltage while the power is being supplied to the load to acquire and store a minimum adjustment term, and controls a driving pulse width of the driving signal generator such that the driving pulse width coincides with the adjustment term in and after a next cycle of power supply.

A start point is set as a time at which the current flowing through the driving coil is 0 A, an end point is set as a time during which the turn-off decider is operated with the designed value, and the pulse width controller sets the adjustment term as a time ranging from the start point to the end point.

A start point is set as a time at which the current flowing through the driving coil is 0 A, an end point is set as a time during which the pulse width measurement comparator is operated in a level less than the designed value, and the pulse width controller measures a gradient of the current flowing through the driving coil based on the start point and the end point and sets the adjustment term according to the gradient of the current or sets the adjustment term such that the pulse width measurement comparator has a predetermined frequency of operations.

The active constant power supply apparatus further includes an auxiliary turn-off decider connected in parallel to the turn-off decider. The auxiliary turn-off decider generates the turn-off signal when the current flowing through the driving coil exceeds the designed value.

The pulse width controller controls the frequency of the driving signal generator in a fixed frequency scheme in such a manner that the driving signal generator generates the next driving pulse with a predetermined time interval after the current charged in the driving coil is completely discharged.

The pulse width controller controls the frequency of the driving signal generator in a fixed turn-off scheme in such a manner that the next driving pulse is generated just after the current charged in the driving coil is completely discharged.

The pulse width controller controls the frequency of the driving signal generator in such a manner that the next driving pulse is generated after the current charged in the driving coil is completely discharged when an input power having the highest value is supplied to the load.

The pulse width controller includes a microprocessor calculating the adjustment term; a timer measuring the switching-on time of the driving signal generator and the switching-off time of the turn-off decider and supplying data thereof to the microprocessor; and a memory storing the adjustment term calculated by the microprocessor.

The pulse width controller further includes a communication module for making communication with an external device.

Two paths are provided for the current passing through the power switch, one of the two paths is connected to a ground terminal, and a remaining one of the two paths is connected to the turn-off decider in such a manner that an amount of the current flowing to the ground terminal is greater than an amount of the current flowing to the turn-off decider to reduce power consumed through the turn-off decider.

The load is divided into at least two loads, which are individually driven, and at least two power switches are connected to the at least two loads, respectively. The power switches are driven at a predetermined time interval.

Both ends of the free-wheeling diode are connected to the outer terminal and the input terminal of the load, respectively, so that the free-wheeling diode is connected to the load in parallel. The free-wheeling diode are installed such that the current flows from the output terminal of the load to the input terminal of the load to discharge the current charged in the driving coil to the load when the power switch is switched off.

A low pass filter is installed at an input terminal or an output terminal of the rectifying circuit.

The low pass filter includes a filter coil and a filter condenser, a first terminal of the filter coil is connected to the rectifying circuit, a second terminal of the filter coil is connected to the load, a first terminal of the filter condenser is connected to the second terminal of the filter coil, a second terminal of the filter condenser is grounded, and a capacitance of the filter condenser is 1 uF or less.

The pulse type driving signal generator, the turn-off decider and the pulse width controller are prepared in the form of a package.

The load includes at least one light emitting diode string, and constant power is supplied to the at least one light emitting diode string at a predetermined time interval.

As described above, the active constant power supply apparatus according to the present invention can rectify power having various intensities and frequencies without using a high capacity condenser for a smoothing circuit which degrades the power factor of a circuit, and can stably supply effective constant power to the load.

BRIEF DESCRIPTION OF THE DRAWINGS

FIG. 4 is a table for explaining a basic concept of an active constant power supply apparatus according to the present invention;

FIGS. 13 and 14 are views showing a fourth waveform representing the driving state of an active constant power supply apparatus according to the present invention;

FIGS. 15 and 16 are views showing a fifth waveform representing the driving state of an active constant power supply apparatus according to the present invention;

FIG. 18 is a first table showing the experimental example of an active constant power supply apparatus according to the present invention;

FIG. 19 is a second table showing the experimental example of an active constant power supply apparatus according to the present invention;

FIG. 23 is a third table showing the experimental example of an active constant power supply apparatus according to the present invention;

FIG. 24 is a fourth table showing the experimental example of an active constant power supply apparatus according to the present invention;

FIG. 25 is a table showing a calculation example of an active constant power supply apparatus according to the present invention;

DETAILED DESCRIPTION OF THE EMBODIMENTS

Hereinafter, an active constant power supply apparatus according to the exemplary embodiments of the present invention will be described with reference to accompanying drawings.

Prior to explaining the active constant power supply apparatus according to the exemplary embodiments of the present invention, the basic concept of the present invention capable of supplying the constant power without using the high capacity condenser for the smoothing circuit will be described.

Figure 1:
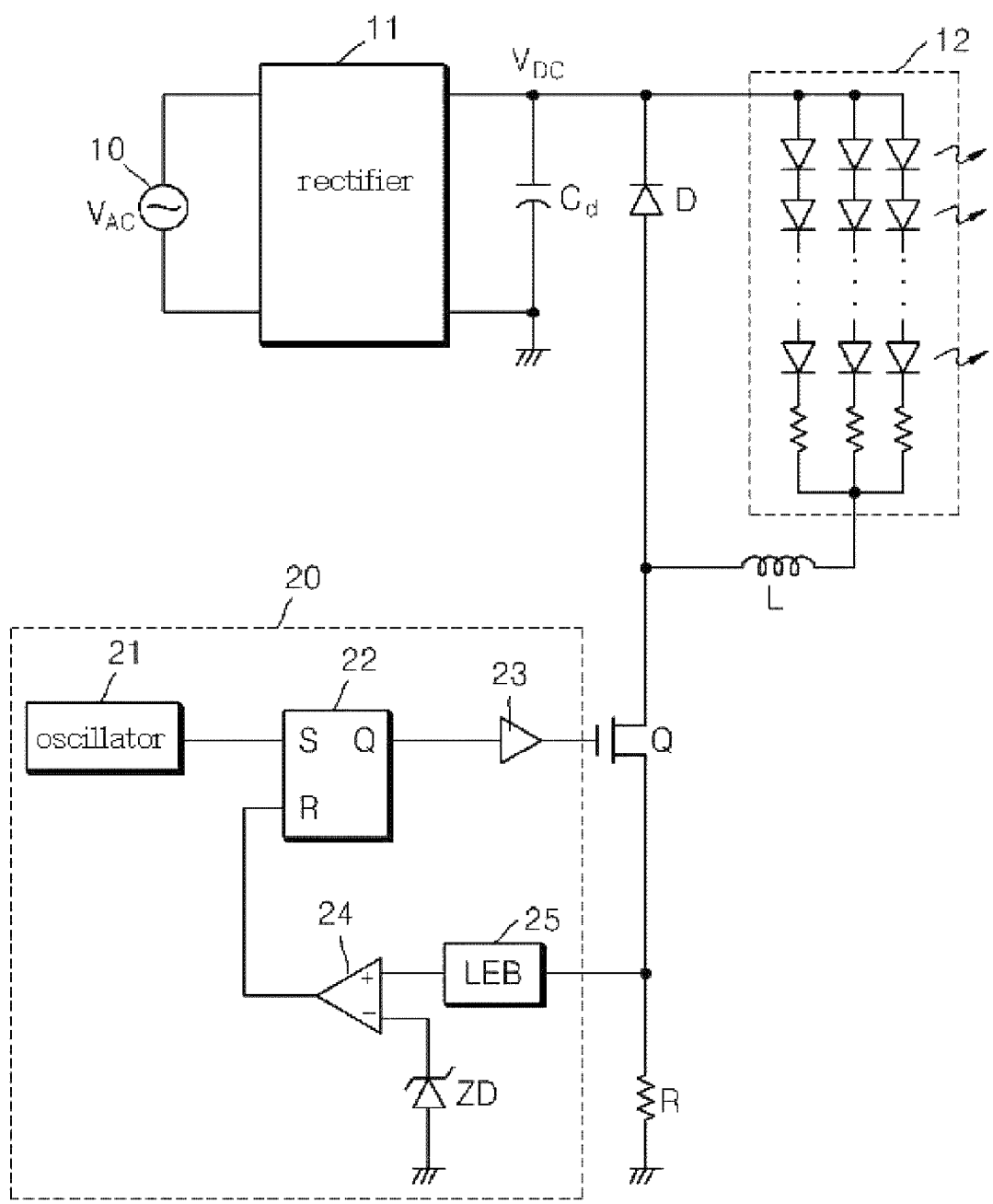
FIG. 1 is a schematic of a constant power supply apparatus according to the related art.
Figure 2:
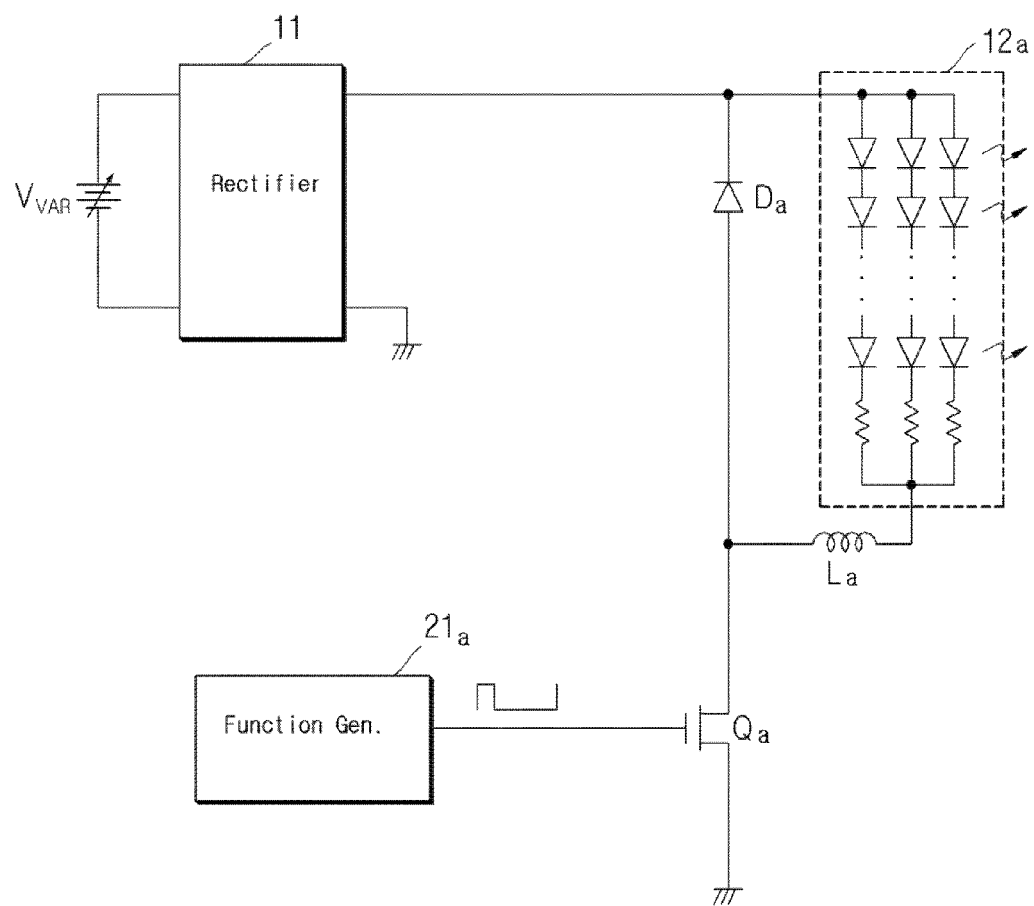
FIG. 2 is a schematic for explaining a basic concept of an active constant power supply apparatus according to the present invention.

FIG. 2 is a schematic for explaining the basic concept of the active constant power supply apparatus according to the present invention, and FIGS. 3 to 8 are views showing the experimental examples representing the basic concept of the active constant power supply apparatus according to the present invention.

As shown in FIGS. 2 to 8, according to the basic concept of the present invention, the width of the driving pulse is set less than a predetermined length (that is, predetermined time) during the term for supplying power to a load 12a, that is, during the term where the driving pulse is high.

In addition, if the intensity of current charged in a driving coil La is constant regardless of the intensity of power supplied from an AC power supplier $V_{VAR}$, the discharge gradient characteristic of the charged current is constant. And the discharge time is linearly changed according to the inductance of the driving coil La regardless of the intensity of power supplied from the AC power supplier $V_{VAR}$, so that the discharge characteristic can be anticipated. Thus, periods (or frequencies) of the driving pulse including the high and low sections of the pulse can be precisely controlled.

Hereinafter, a circuit and a method for measuring the basic characteristics of the constant power supply apparatus according to the present invention will be described in detail.

As shown in FIG. 2, the constant power supply apparatus includes a variable power source (AC power supplier $V_{VAR}$), a rectifier 11 connected to an output terminal of the variable power source $V_{VAR}$, a load 12a (for instance, LED string) connected to an output terminal of the rectifier 11, a driving coil La connected to an output terminal of the load 12a, a free-wheeling diode Da connected to the load 12a in parallel such that the current can be circulated to the load 12a, a power switch Qa connected to an output terminal of the driving coil La such that current can flow through the power switch Qa by way of the load 12a and the driving coil La, and a function generator 21a connected to a gate terminal of the power switch Qa to generate driving pulses for controlling on/off operations of the power switch Qa.

Thus, as the power switch Qa is turned on, the current supplied from the variable power source $V_{VAR}$ flows to the ground by way of the rectifier 11, the load 12a, the driving coil La and the power switch Qa so that energy is charged in the driving coil La. In contrast, if the power switch Qa is turned off, the energy charged in the driving coil La is discharged to the load 12a through the free-wheeling diode Da.

In the basic characteristic measurement test, the load 12a is prepared by connecting twenty LED strings in parallel to each other. The forward on-voltage of the load 12a is set to 50.3V (20 mA). In addition, the driving coil La is set to 300 uH, the variable power source $V_{VAR}$ is set to 370V, and the function generator 21a is set to 1 KHz.

In addition, the driving pulse width of the function generator 21a is gradually increased from 0 to 25 μs, and when a maximum value of instantaneous current of the power switch Qa reaches 1.2 A, the driving pulse width of the power switch Qa and the time for completing the discharge of the energy charged in the driving coil La are measured and recorded. In addition, the measurement is performed with respect to the variable power source $V_{VAR}$ of 250V, 170V and 110V.

Figure 3:
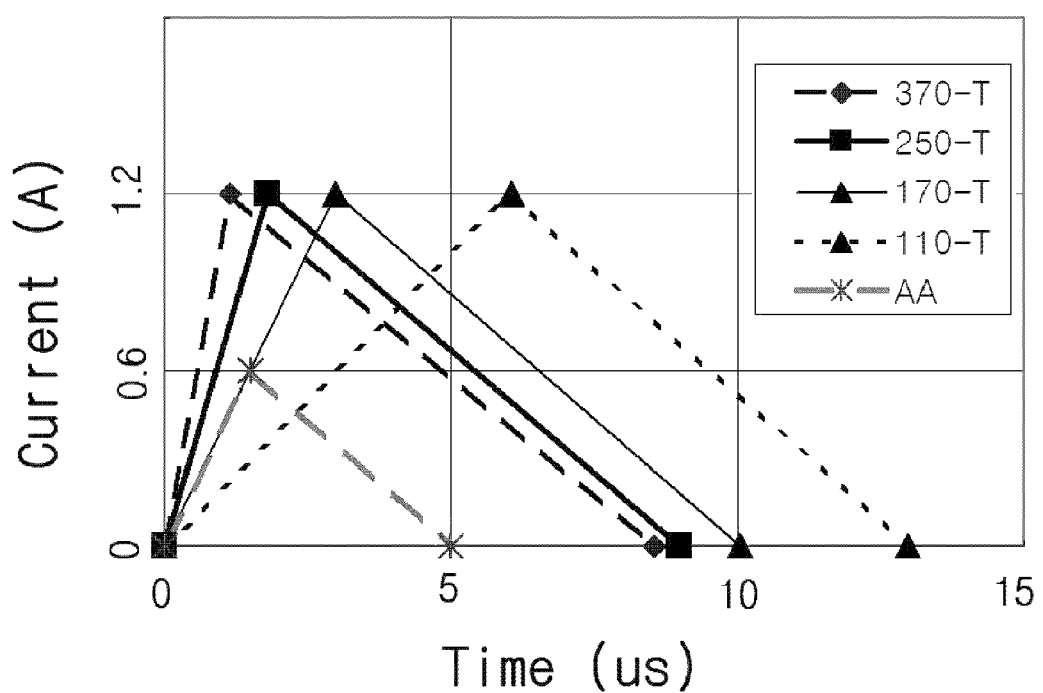
FIG. 3 is a graph for explaining a basic concept of an active constant power supply apparatus according to the present invention.

Further, the measurement is performed while variously setting the driving coil La to 400 uH, 500 uH, and 600 uH, and the measurement result is partially shown in FIGS. 3 and 4.

FIG. 3 shows a graph when the driving coil La is set to 300 uH. The section where the current value of the driving coil La is increased is a current charge section for the driving coil La. And the section where the current value of the driving coil La is decreased is a current discharge section for the driving coil La.

The main features of the graph are as follows. First, the discharge gradient of the driving coil La is constant regardless of the voltage of the variable power source $V_{VAR}$ (hereinafter, referred to as input voltage) supplied to the load 12a through the rectifier 11. This is because the power switch Qa is turned off and the driving coil La starts to discharge the energy when the instantaneous current of the power switch Qa is 1.2 A regardless of the input voltage. Second, there exists a linear relation. In detail, if the power switch Qa is turned off (mark "AA") when the instantaneous current of the power switch Qa is 0.6 A, the turn-on term of the power switch Qa is about ½ of 1.2 A (mark "170-T") and the current charged in the driving coil La is about ¼ of 1.2 A (mark "170-T").

In addition, referring to the discharge time shown in FIG. 4, the discharge time is about 7 μs for all input voltages when the driving coil is set to 300 uH. And the discharge time is about 14 μs for all input voltages when the driving coil is set to 600 uH. That is, the discharge time is constant.

Thus, if the values shown in FIG. 4 are regulated based on the input voltage of 370V, as can be seen from the inclined characters, the discharge time is substantially constant regardless of the capacity of the driving coil La, so the circuit shown in FIG. 2 is a predictable system.

For instance, if the values for the 300 uH and 600 uH shown in FIG. 4 are employed in order to anticipate the charge time and discharge time under the input voltage of 370V when the driving coil La is set to 450 uH, the charge time is calculated as to (1.14+2.27)/2 and the discharge time is calculated as to (8.55+16.5)/2.

Meanwhile, in order to supply the same current to the load 12a while increasing the voltage applied to the driving coil La by two times, the turn-on time of the power switch Qa is reduced to a half. For instance, in FIG. 4, if the input voltage is 110V, about 60V is applied to the driving coil La. In addition, if the input voltage is 170V, about 120V is applied to the driving coil La. In this case, the turn-on time of the power switch Qa is 6.05 (110V) Vs 2.99 (170V) when the driving coil La is set to 300 uH, and 12.3 (110V) Vs 6.03 (170V) when the driving coil La is set to 600 uH which is two times greater than the former. This linear relation is applicable even if voltage is changed at both terminals of the load 12A due to the variation in number of the LED strings.

Hereinafter, the driving schemes employed in the present invention will be described based on the above experimental result.

The driving schemes employed in the present invention may include a fixed frequency scheme, a fixed turn-off term scheme and a fixed turn-on term scheme.

Driving Scheme 1—Fixed Frequency Scheme

Figure 5:
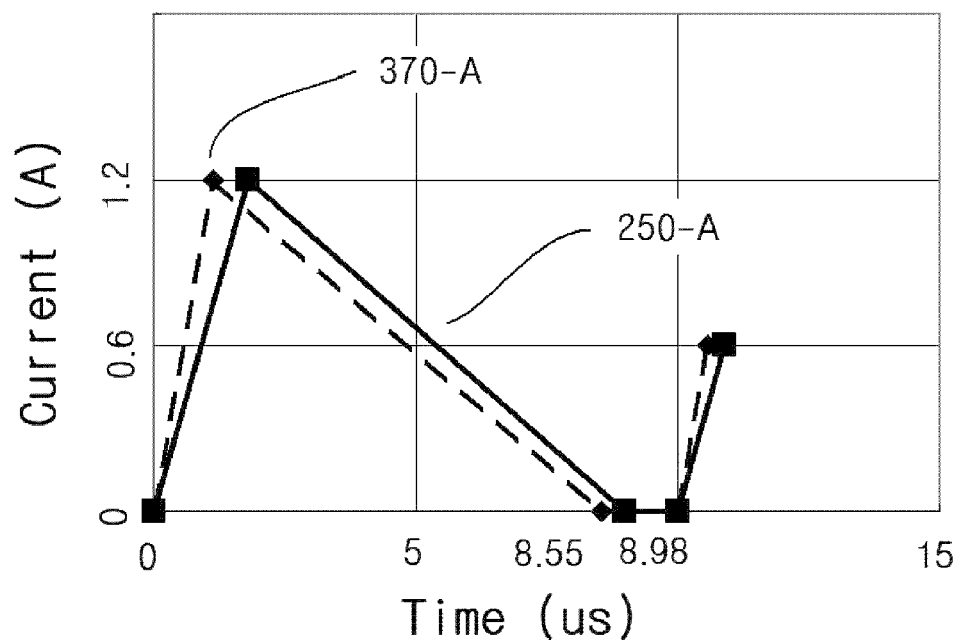
FIG. 5 is a graph for explaining a basic concept about a fixed frequency driving scheme for an active constant power supply apparatus according to the present invention.

FIG. 5 is a graph showing the input voltage 250V and 370V when the driving coil La shown in FIG. 2 is set to 300 uH. In the above two voltage levels, the current applied to the driving coil La is marked with "250-A" and "370-A", respectively.

In the case that the power switch Qa is driven in a period longer than 8.98 μs, which represents the switch Qa is driven after the driving coil La is completely discharged (discontinuous current mode), the current variation between the above two voltage levels is calculated as to (8.98/8.55)×100=5.029%, which is relatively low.

Driving Scheme 2—Fixed Turn-Off Term Scheme

Figure 6:
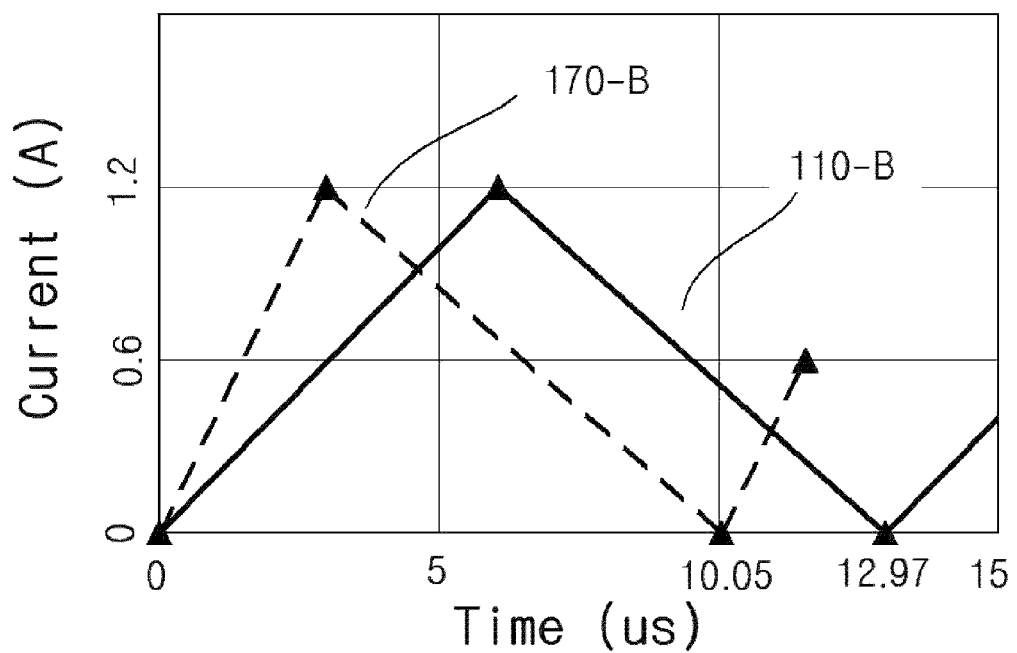
FIG. 6 is a graph for explaining a basic concept about a fixed turn-off driving scheme for an active constant power supply apparatus according to the present invention.

FIG. 6 is a graph showing the input voltage 110V and 170V when the driving coil La shown in FIG. 2 is set to 300 uH. In the above two voltage levels, the current applied to the driving coil La is marked with "110-B" and "170-B", respectively.

The current variation between the above two voltage levels is calculated as to (12.97/10.05)×100=29.055%, which is relatively high.

In this case, since the discharge time and the discharge gradient of the driving coil La are constant, it is preferred to employ the fixed turn-off term scheme, in which the next switching cycle starts just after the discharge operation of the driving coil La has been completed in each voltage (that is, 10.05 μs and 12.97 μs). Theoretically, the current deviation between the two voltage levels is 0.

Meanwhile, if the input voltage is low, it takes much time to charge the driving coil La with the predetermined level, so that the driving frequency is low. In contrast, if the input voltage is high, the driving frequency is also high.

Driving Scheme 3—Fixed Turn-on Term Scheme

Figure 7:
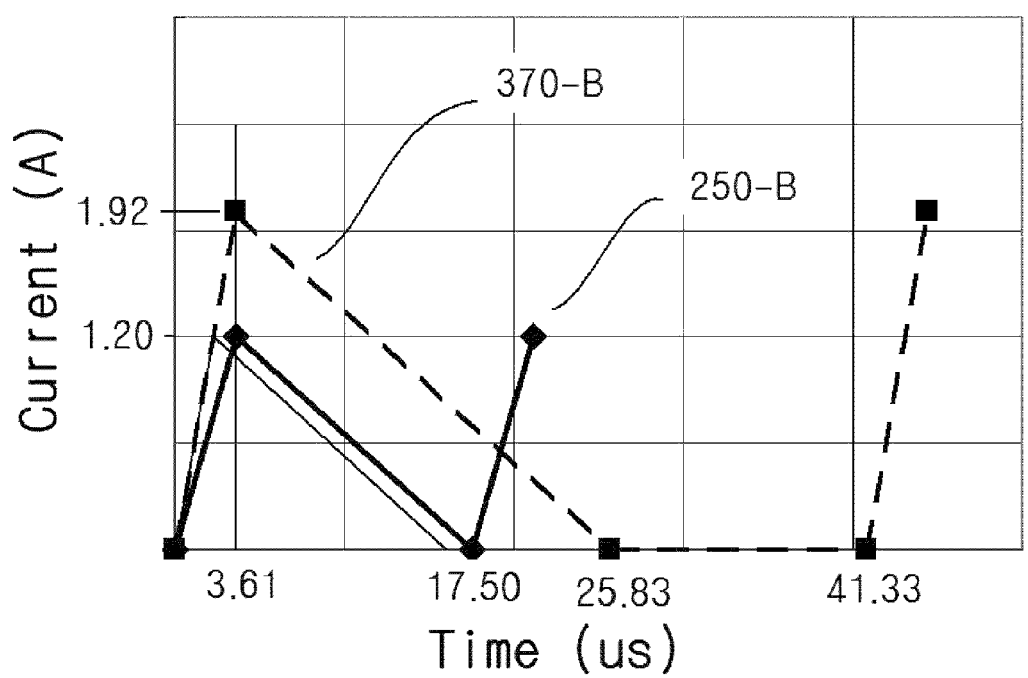
FIG. 7 is a graph for explaining a basic concept about a fixed turn-on driving scheme for an active constant power supply apparatus according to the present invention.

FIG. 7 is a graph showing the input voltage 250V and 370V when the driving coil La shown in FIG. 2 is set to 600 uH. In the above two voltage levels, the current applied to the driving coil La is marked with "250-B" and "370-B", respectively.

First, the turn-on time (that is, the driving pulse width) of the power switch Qa is fixed to 3.61 μs regardless of the level of the input voltage.

In the case that the input voltage is 250V (load voltage 50V and coil voltage 200V), the current 250-B flowing through the power switch Qa and the driving coil La after the turn-on of the power switch Qa is continuously increased from 0 A, and reaches 1.2 A when the power switch Qa is turned off (3.61 μs).

In addition, after the turn-off of the power switch Qa, the current 250-B charged in the driving coil La is discharged through the free-wheeling diode Da. In this case, the discharge end time is 17.50 μs and the next switching cycle starts just after the end of the discharge operation.

An area obtained from the waveform of the current 250-B can be calculated as to (1.2 A×17.50 μs)/2=10.50 A-μs.

In contrast, in the case that the input voltage is 370V (load voltage 50V and coil voltage 320V), the power switch Qa is turned off when the current 370-B charged in the driving coil La reaches 1.92 A, which is higher than the current 250-B in the input voltage of 250V.

The current charged in the driving coil La is discharged with the same gradient as that of the input voltage 250V and the discharge end time is 25.83 μs.

An area obtained from the waveform of the current 370-B can be calculated as to (1.92 A×25.83 μs)/2=24.80 A-μs, which signifies that the current supplied to the load 12a is greater than the current in the input voltage of 250V by 2.362 times.

Therefore, if the next switching cycle starts at 41.33 μs, which is 2.362 times greater than the discharge end time of 17.50 μs in the input voltage of 250V, the current having the value the same as that of the current in the input voltage of 250V can be supplied to the load 12a.

Meanwhile, the current gradient of the power switch Qa representing the input voltage can be recognized by measuring the time at which the current has a predetermined value lower than a designed value (for example, 1 Amp in FIG. 7). And the start time of the next switching cycle can be easily calculated based on the above measurement value.

In this case, the driving frequency is relatively low if the input voltage is high because the discharge time is lengthened due to a greater amount of energy charged in the driving coil La. In addition, the driving frequency is relatively high if the input voltage is low.

If the active constant power supply apparatus according to the present invention is driven through the above driving schemes, the maximum value of the instantaneous current supplied to the load 12a is constant in each cycle of the input voltage, so the constant power can be stably supplied without using the condenser for the smoothing circuit. This status is shown in FIG. 8.

Figure 8:
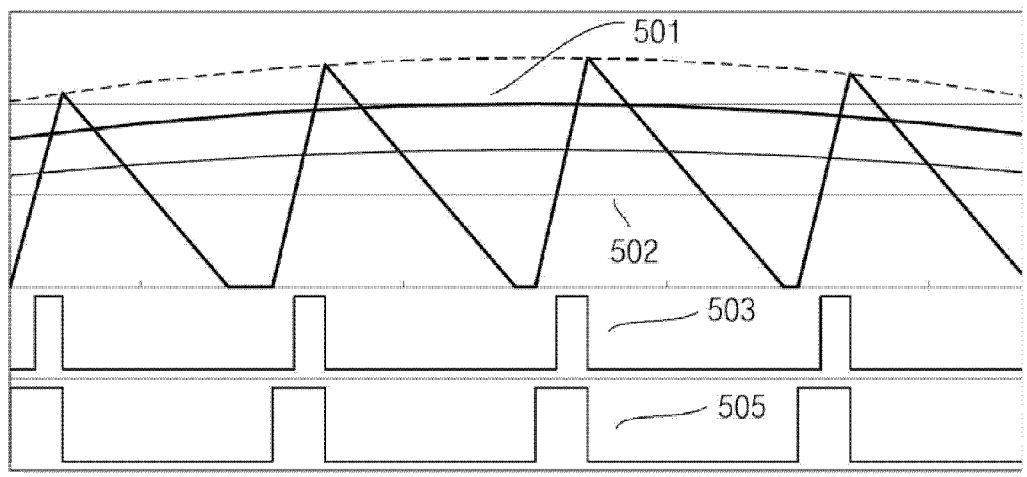
FIG. 8 is a graph for explaining a basic concept about a smoothing state of input power for an active constant power supply apparatus according to the present invention.

Among envelopes of the current flowing through the driving coil La shown in FIG. 8, a central envelope 501 marked with a solid line represents an envelope having a driving pulse width properly adjusted and the input voltage is properly smoothed.

According to the present invention, the smoothing can be obtained by adjusting the driving pulse width and employing one of the above driving schemes, which is different from the related art using the high capacitance condenser.

Embodiment 1

Hereinafter, the active constant power supply apparatus according to the first embodiment of the present invention will be described with reference to accompanying drawings.

Figure 9:
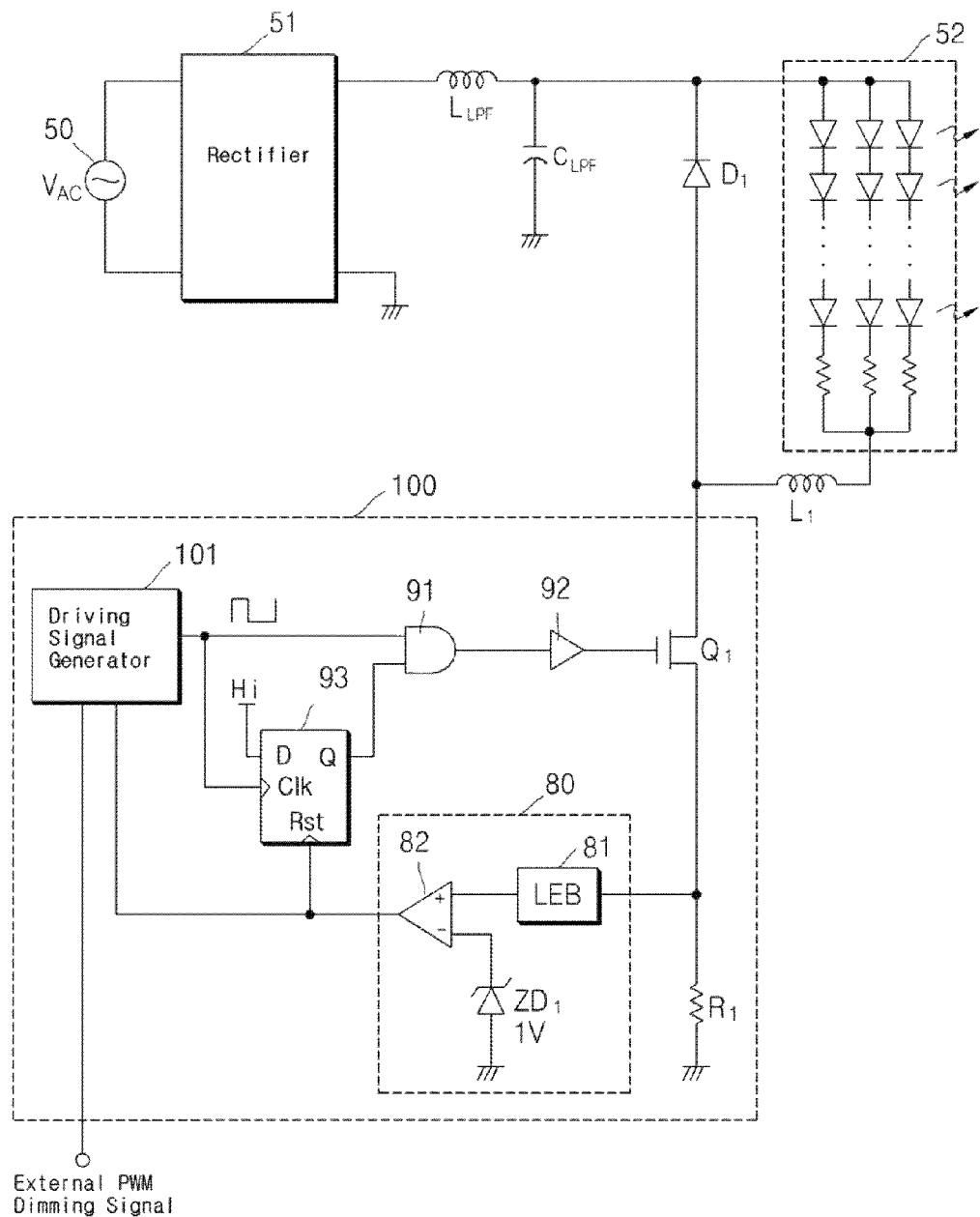
FIG. 9 is a schematic of an active constant power supply apparatus according to the first embodiment of the present invention.

FIG. 9 is a schematic of the active constant power supply apparatus according to the first embodiment of the present invention.

As shown in FIG. 9, the active constant power supply apparatus according to the first embodiment of the present invention includes an AC power supplier 50, a rectifier 51, low pass filters $L_{LPF}$ and $C_{LPF}$, a load 52, a driving coil L1, a free-wheeling diode D1, a power switch Q1, a resistor R1, a turn-off decider 80, a driving signal generator 101, a flip-flop 93, an AND logic 91 and a switch driver 92. The turn-off decider 80 includes an LEB (Leading Edge Blanker) 81, a Zener diode ZD1 to generate reference voltage, a comparator 82 and a pulse width controller (not shown).

The rectifier 51 is connected to an output terminal of the AC power supplier 50 to rectify the AC power. And the low pass filters including the filter coil $L_{LPF}$ and the filter condenser $C_{LPF}$ are connected to an output terminal of the rectifier 51 to filter high frequency components of the supply current.

In addition, the load 52, such as an LED string, is connected to an output terminal of the low pass filters to receive power (hereinafter, referred to as input power). And the driving coil L1 is connected to an output terminal of the load 52 in series. The free-wheeling diode D1 is connected to the load 52 in parallel such that the current can be circulated to the input terminal of the load 52.

Further, the power switch Q1 is connected to an output terminal of the driving coil L1 so that the current flows through the power switch Q1 by way of the load 52 and the driving coil L1. The resistor R1 is connected to an output terminal of the power switch Q1.

In addition, the turn-off decider 80 is connected to an output terminal of the power switch Q1. The LEB 81 for blanking leading edge voltage from the current flowing through the power switch Q1 is connected to a non-inverting terminal (+) of the comparator 82 of the turn-off decider 80. And the Zener diode ZD1 is connected to an inverting terminal (−) of the comparator 82 of the turn-off decider 80.

The driving signal generator 101 is connected to a gate terminal of the power switch Q1 through the AND logic 91 and the switch driver 92 in order to control the switching operation of the power switch Q1. At this time, one input terminal of the AND logic 91 is connected to the flip-flop 93. And a reset terminal Rst of the flip-flop 93 is connected to an output terminal of the turn-off decider 80.

Furthermore, the output terminal of the turn-off decider 80 is connected to the driving signal generator 101 in order to control the driving pulse width and the term.

Hereinafter, the active constant power supply apparatus according to the first embodiment based on the fixed frequency scheme will be described. As the driving signal generator 101 generates the digital driving pulses with the fixed frequency/fixed pulse width, the output of the D-flip-flip 93 becomes high at the rising edge of the pulse. If a driving pulse is generated from the driving signal generator 101 and the output of the D-flip-flip 93 becomes high, the output of the AND logic 91 becomes high, so that the power switch Q is turned on (switched on) by the switch driver 92.

In contrast, the power switch Q1 is turned off, 1) when if the driving pulse becomes low from high 2) or the output of the flip-flop 93 becomes low after the flip-flop 93 is reset by the turn-off decider 80.

As the power switch Q1 is turned on, the energy is charged in the coil L1 serving as the charged device while the AC current supplied from the AC power supplier 50 is flowing to the ground by way of the rectifier 51, the low pass filters, the load 52, the coil L1, the power switch Q1 and the resistor R1.

Since the power switch Q1 is driven with pulses and the switch current is continuously increased by the driving coil L1, current greater than designed current by several times (hereinafter, the current will be referred to as multiply current and the multiply current is set two times greater than the designed current in the present invention) must flow as the switch is driven once.

In addition, if the load 52 is a normal resistance load, the maximum instantaneous current can be obtained by multiplying the designed current by the multiply current after multiplying the designed current by 1.414. If the load 52 is an LED (light emitting diode), the current rarely flows under the forward turn-on voltage $V_F$, so the maximum instantaneous current is slightly higher than the resistance load 52.

Therefore, a value of the resistor R1 used for detecting the current can be obtained by dividing the value of the reference voltage (or designed voltage value) of the turn-off decider 80 applied to the Zener diode ZD1 by the maximum value of the designed instantaneous current.

As the power switch Q1 is turned on, the current flowing through the power switch Q1 and the resistor R1 is continuously increased by the driving coil L1 serving as the charged device. If the current reaches the maximum value of the designed instantaneous current, the turn-off decider 80 is operated so that the power switch Q1 is turned off.

Then, the pulse width controller (not shown) measures the frequency of operation and the minimum operation term (that is, the shortest turn-on term) of the turn-off decider 80 during 1 cycle (1T) of the input voltage and allows the driving signal generator 101 to generate the driving pulses from the next cycle (that is, the second cycle 2T) based on the measured minimum turn-on term of the switch.

In detail, the current value is gradually increased from the zero point (or the point nearby the zero point). And then the power switch Q1 is turned off when the current value reaches the designed value suitable for operating the turn-off decider 80. The adjustment term for controlling the driving pulse width in the next cycle of the input voltage is set based on the above, so that the constant power can be stably supplied without using the smoothing condenser having the high capacitance used in the related art.

To this end, the pulse width controller (not shown) includes a microprocessor for calculating the adjustment term, a timer measuring the start point (zero point) and the end point (designed value) and supplying them to the microprocessor, and a memory storing the adjustment term calculated by the microprocessor. Preferably, the pulse width controller may further include a communication module for communicating with the external device to notify the result to the outside or to control the adjustment term according to the command from the outside.

Meanwhile, if there is no variation of the input voltage after the driving pulse width has been properly adjusted, ideally, the turn-off decider 80 operates once in the subsequent cycle of the input voltage (that is, after the third cycle 3T).

Figure 10:
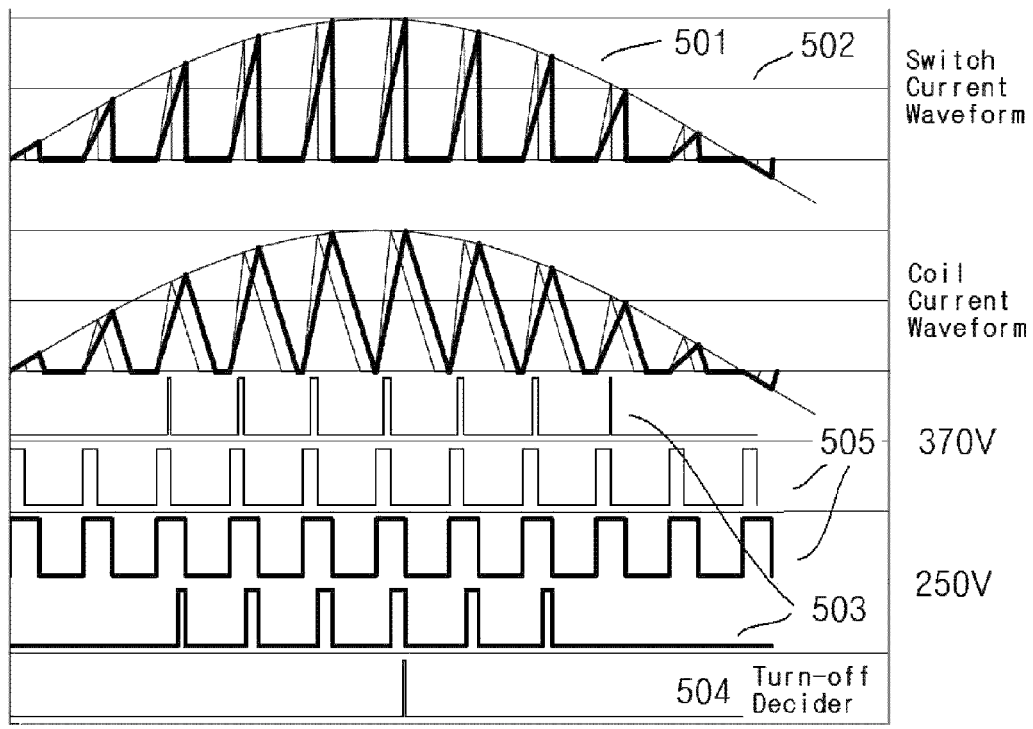
FIG. 10 is a view showing a first waveform representing the driving state of an active constant power supply apparatus according to the present invention.

This signifies that the power switch Q1 is operated with the fixed frequency/fixed pulse width in one cycle of the input voltage, which can be understood from FIG. 10 showing the waveforms of the power switch Q1 and the coil L1 in one cycle of the input voltage.

The charge current gradient is high when the input voltage is high, and the discharge term is constant regardless of the level of the input voltage.

However, if the input voltage becomes high after the driving pulse width has been properly adjusted, the turn-off decider 80 may operates several times. In this case, the driving signal generator 101 adjusts the driving pulse width of the next cycle based on the shortest switch turn-on term from among the switch turn-on terms measured by the pulse width controller.

If the measurement value of the turn-on terms cannot be used due to low resolution, the driving pulse width is reduced proportionally to the frequency of operation of the turn-off decider 80 and the driving pulse width is used in the next cycle of the input voltage.

Figure 11:
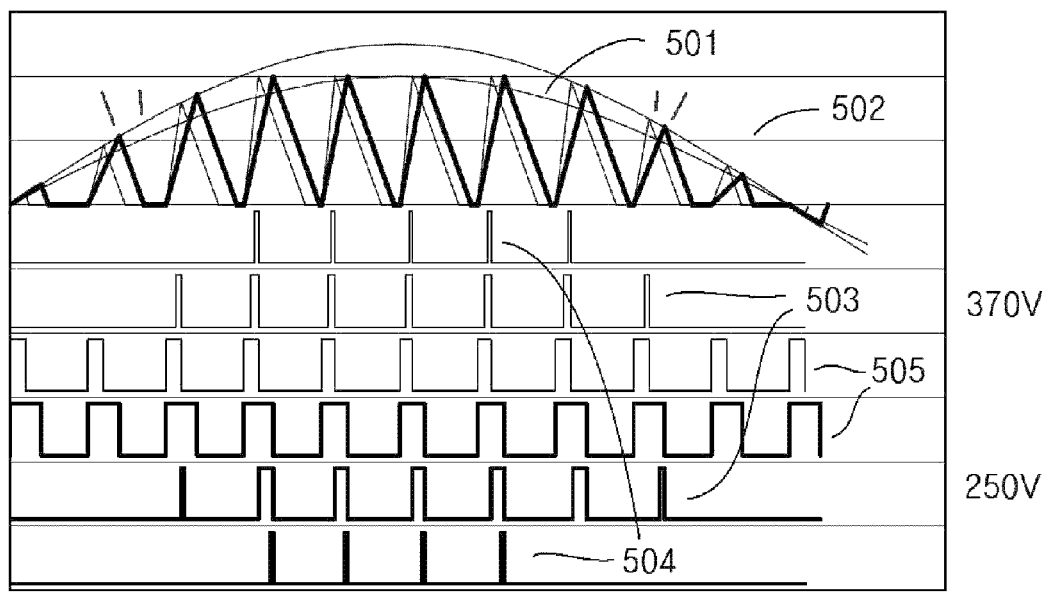
FIG. 11 is a view showing a second waveform representing the driving state of an active constant power supply apparatus according to the present invention.

The current waveforms of the above case are schematically shown in FIG. 11.

Figure 12:
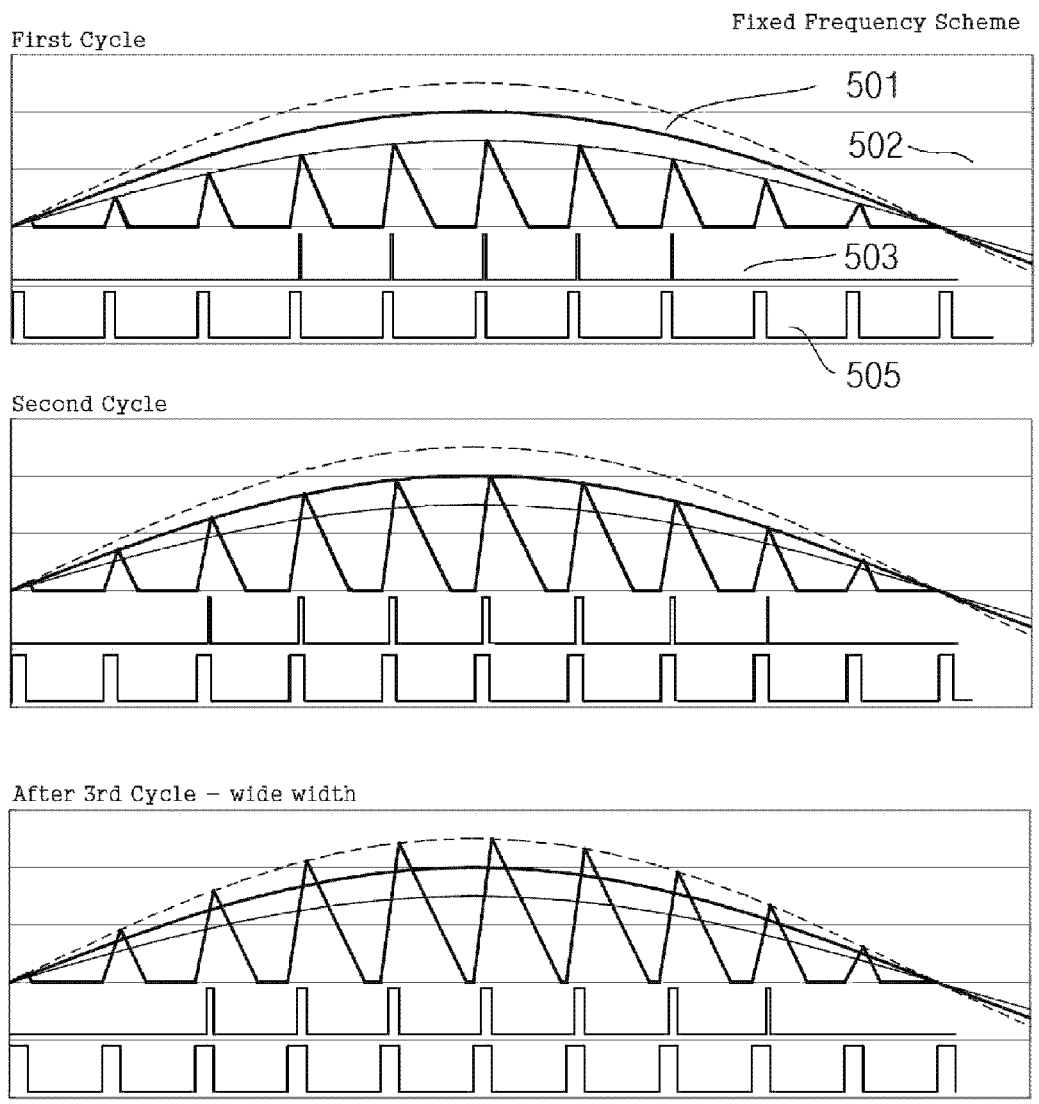
FIG. 12 is a view showing a third waveform representing the driving state of an active constant power supply apparatus according to the present invention.

If the input voltage is lowered, the turn-off decider 80 may not operate. In this case the driving signal generator 101 enlarges the driving pulse width by a minimum unit (that is, the switching-on time is lengthened) to provide the driving pulse width to the next cycle of the input voltage. The current waveforms of this case are schematically shown in FIG. 12.

Figure 13:
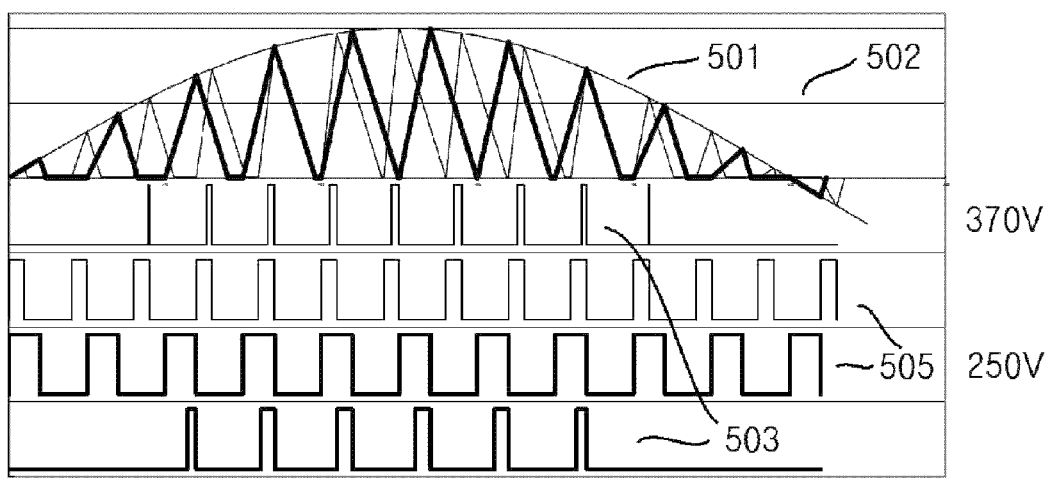
Figure 15:
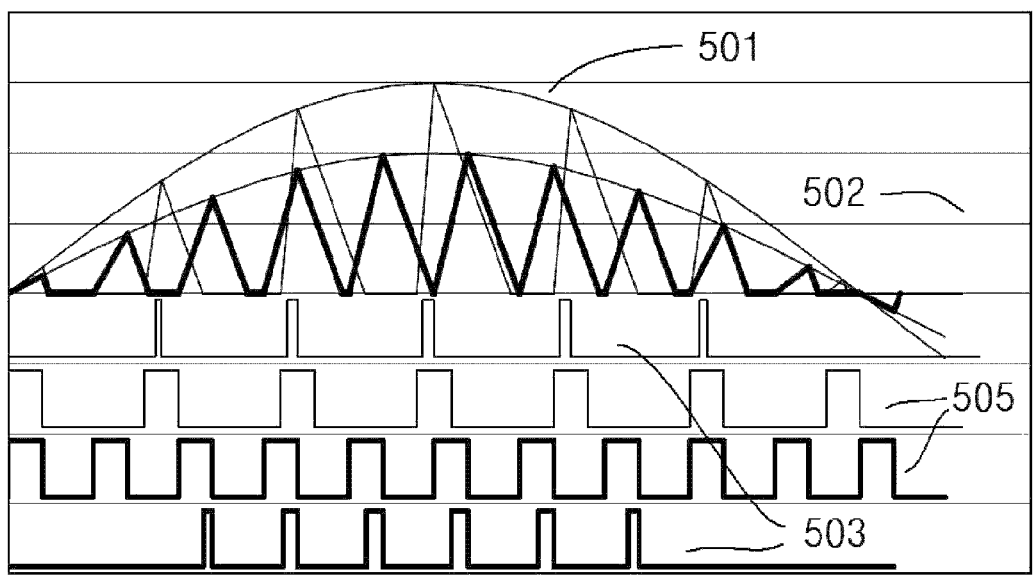

FIGS. 13 and 14 show the driving result of the circuit shown in FIG. 9 in the fixed turn-off term scheme. And FIGS. 15 and 16 show the driving result of the circuit shown in FIG. 9 in the fixed turn-on term scheme. The same result may be achieved when the circuit is driven through the fixed turn-off term scheme and the fixed turn-on term scheme.

Experimental Example 1

Hereinafter, the experimental examples of the active constant power supply apparatus according to the first embodiment of the present invention will be described with reference to FIG. 9.

Figure 17:
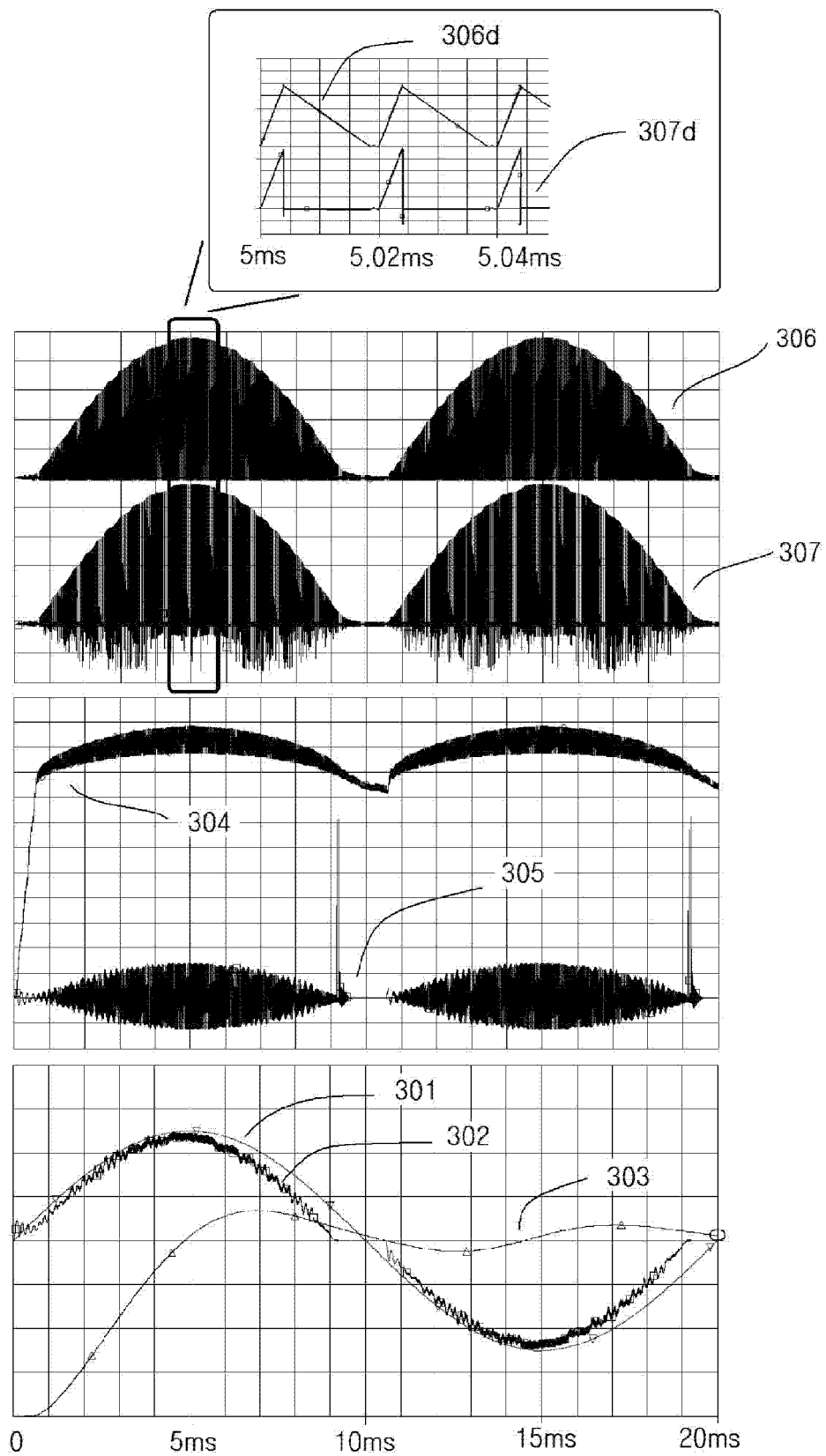
FIG. 17 is a view showing a sixth waveform representing the driving state of an active constant power supply apparatus according to the present invention.

The circuit shown in FIG. 9 is subject to the simulation test (serial No. A029) by using a computer. And the waveforms obtained from the simulation test are shown in FIG. 17. In the simulation test, the load 52 is prepared in the form of LED strings. If 20 mA is applied to the load 52, voltage at both terminals of the LED string is 50.3V. The load 52 is formed by connecting 40 LED strings in parallel and a load resistor having 10Ω is connected to each LED string in series.

The AC input voltage is 176VAC, which is 80.4% of 220VAC, the maximum rectifying voltage is 250V, the power frequency is 50 Hz. The filter coil $L_{LPF}$ is set to 2 mH. The filter condenser $C_{LPF}$ is set to 0.3 uH. The driving coil L1 is set to 320 uH. The driving frequency is 50 KHz. The driving pulse width is 3.8 μs, and a 40 nF condenser is added to both terminals of the load 52 in order to eliminate the switching noise.

The purpose of the simulation test A029 is to inspect the power factor, the current harmonic content and the current of the load 52 when the power switch Q1 is driven with the fixed pulse width of 3.8 μs in one cycle of the input voltage. The simulation test A029 is not the over-current (surge current) test. Thus, the resistor R is set to 0.01Ω and the switch turn-off decider 80 may not operate even once.

Referring to FIG. 17, a power current 302 of the AC power supplier 50 is faster than an input voltage 301 by an angle of 4.6°. And the maximum instantaneous value of the power current 302 is 245 mA. And an effective current 303 of each LED is 20.6 mA at the region of 20 ms. In addition, a voltage 304 at both terminals of the load 52 is in the range of 41.6V to 54.2V at the region between 10 ms and 20 ms.

In addition, a voltage 305 at both terminals of the filter coil $L_{LPF}$ is in the range of +7V to −7V and relative high voltage having the maximum value of 36V appears five times at the region of 9.2 ms. Further, a current waveforms 306 and 306d of the driving coil L1 and a current waveforms 307 and 307d of the power switch Q1 have been examined in detail, as a result, the maximum value is represented as 2.38 A and the current charged in the driving coil L1 is completely discharged before the next switching cycle starts.

Referring to FIG. 18, the frequency components of the current supplied from the AC power supplier 50 have been analyzed through FFT (Fast Fourier Transform) scheme to the extent of the $40^{th}$ harmonic. As a result, the THD (Total Harmonic Distortion), the first harmonic phase angle (hereinafter, referred to as first phase angle), the power factor calculated based on the THD and the first phase angle, and the effective current of each LED measured at the region of 20 ms have been detected.

According to the result of serial No. A029, the power factor is very high (0.989), the THD is 12.4%, and the first phase angle is 175.4°. The first phase angle may become 4.6° if the current measurement terminal is changed. Power of the load 52 is 41.4 watt (20.6 mA×50.3V×40 LED strings).

In addition, the simulation test A016 shown in FIG. 18 has been performed under the same conditions of the simulation test A029 except that the input voltage is changed to the level corresponding to 118.9% of 220VAC, and the power switch Q1 is driven with 2.4 μs such that the maximum value of the instantaneous current is equal to that of the simulation test A029. The current of each LED is represented as 20.5 mA and the power factor is represented as 0.975, which is very high.

The maximum value of the instantaneous current of the AC power supplier 50 is 167 mA, which is lower than 245 mA of the simulation test A029. This is because the increment of the input voltage is supplied to the load 52 after being charged in the driving coil L1. However, supply power and the power of the load 52 are the same as those of the simulation test A029.

According to the result of the two simulation tests, the present invention represents that the current variation of each LED is 2% or less, which is very stable, even though the input voltage is changed from 80% to 120%. And the power factor is 0.97 or above, which is very high. In addition, the THD is 15% or less, which signifies that the waveform distortion of the power current is low. In addition, the phase difference between the input voltage and the current is 11° or less, which is very low.

Meanwhile, the simulation tests B204 and B205 shown in FIG. 18 are performed under the conditions that the input voltage of the AC power supplier 50 is 77.8% and 120.2% of 100VAC, respectively. The voltage at both terminals of the load 52 is 24.2V. The driving coil L1 is set to 168 uH. And the filter coil $L_{LPF}$ and the filter condenser $C_{LPF}$ are set to 2 mH and 0.3 uH, respectively, which are the same as those of the previous tests. The current of each LED is set to 20.14 mA and 20.45 mA, respectively, in which the variation is 1.54% and the power factor is 0.99 or above.

In addition, the harmonic contents of the power current in the simulation tests and the Class C standard of IEC 1000-3-2 (hereinafter, referred to as Class C standard) are shown in FIG. 19. The results of the simulation tests A016, A029, B024 and B025 satisfy the Class C standard.

When simply calculating the maximum power efficiency in FIG. 9, first, there is no power loss in the filter coil $L_{LPF}$, the filter condenser $C_{LPF}$, and the driving coil L1 because the current is discharged after being charged in each component.

Second, effective 1V is applied to the rectifying diode, effective 0.2V is applied to the 10Ω connected to the LED strings in series. Effective 0.05V (0.2V×maximum duty ratio 0.5× sawtooth wave 0.5) is applied to the power switch Q1. And effective 0.25V (1V/4) is applied to the detection resistor R1. Therefore total 1.5V is consumed. In the case that the voltage at both terminals of the load 52 is 50.3V, the efficiency is 97%. In addition, if the voltage at both terminals of the load 52 is 24.2V, the efficiency is 93.8%.

Therefore, if the voltage applied to the detection resistor R1 is reduced to 0.25V, the consumed voltage is 1.31V. At this time, the maximum efficiency is 97.4% and 94.6%, respectively.

Meanwhile, in the simulation tests A016 and A029, the driving coil L1 is set to 320 uH so that the current of 2.38 A flows through the driving coil L1 and the filter coil $L_{LPF}$ is set to 2 mH so that the current of 245 mA flows through the filter coil $L_{LPF}$. Thus, the physical size of each coil is similar to each other. In addition, since the capacity of the filter condenser $C_{LPF}$ is 1 uF or less, a film condenser having the superior reliability can be used instead of the electrolyte condenser employed in the smoothing circuit, so that the reliability and the life span of the power source device can be improved. Further, since the 40 nF condenser is added to both terminals of the load 52 to eliminate the noise, a greater amount of smoothed current can be smoothed if the capacity of the 40 nF condenser is increased so that a greater amount of current can be supplied to the load 52.

The active constant power supply apparatus according to the first embodiment of the present invention has been described above in detail. According to the present embodiment, the circuit for measuring the gradient of current of the power switch Q1 is omitted, which will be described later, so that the present embodiment is most suitable for the fixed frequency scheme.

In addition, according to the present embodiment, the high voltage/high capacitance smoothing condenser, which is expensive and has a large physical size, is not necessary so that the power source device and the LED lamp can be manufactured in a small size.

Embodiment 2

Hereinafter, an active constant power supply apparatus according to the second embodiment of the present invention will be described in detail with reference to accompanying drawings.

Figure 20:
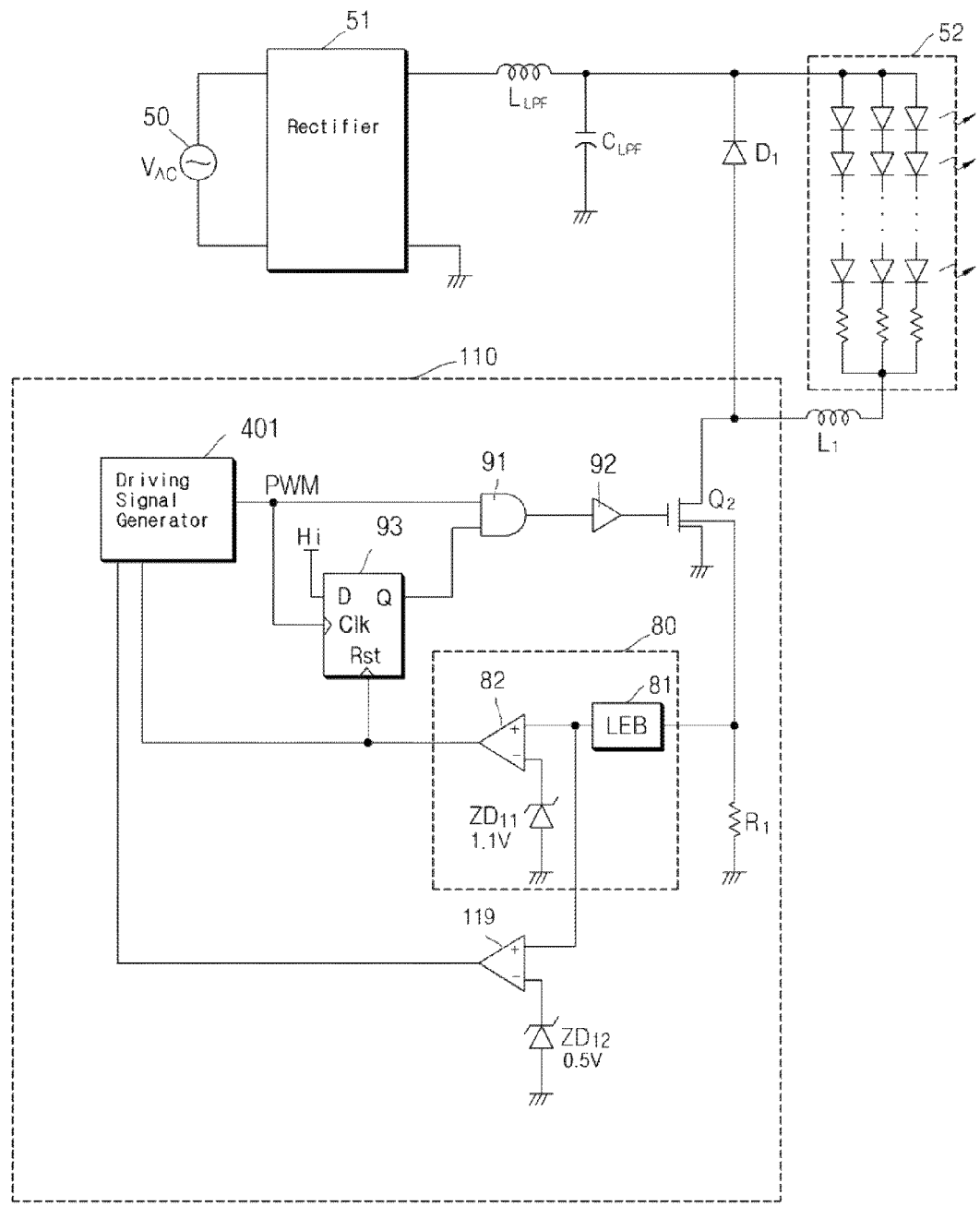
FIG. 20 is a schematic of an active constant power supply apparatus according to the second embodiment of the present invention.

FIG. 20 is a schematic of the active constant power supply apparatus according to the second embodiment of the present invention.

According to the second embodiment of the present invention, the turn-off decider 80 is used as an auxiliary turn-off decider, which is operated only when a surge current, such as thunderbolt, occurs and does not operate under the normal input voltage. In detail, the power switch Q2 has the constant turn-on term in the one cycle of the input voltage and an additional gradient measurement circuit for adjusting the driving pulse width may serve as the turn-off decider 80 according to the first embodiment. The second embodiment of the present invention is suitable for the above-described three driving schemes.

That is, the second embodiment of the present invention further includes a gradient measurement circuit having a non-inverting terminal of the gradient measurement comparator 119 receiving the same signal input into a non-inverting terminal of the comparator of the turn-off decider 80. And an inverting terminal of the gradient measurement comparator 119 connected to a Zener diode ZD12. The turn-off decider 80 operates only when abnormal current is input. In addition, a voltage (for example: 1.1V) exceeding the designed value (for example: 1V) is applied to a Zener diode ZD11 connected to the non-inverting terminal of the comparator 82. And a voltage (for example: 0.5V) not exceeding the designed value (for example: 1V) is applied to the Zener diode ZD12 connected to the inverting terminal of the comparator 119 for measuring the gradient.

Therefore, according to the second embodiment of the present invention, the reference voltage of the Zener diode ZD11 is set in such a manner that the turn-off decider 80 can be operated under the current higher than the designed current. And the reference voltage of the Zener diode ZD12 is set in such a manner that the comparator 119 can be operated when the instantaneous current flowing through the power switch Q2 is lower than the designed maximum current. For instance, referring to FIG. 20, the reference voltages are set in such a manner that the comparator 119 for measuring the gradient can be operated at 0.5V (50% of the designed maximum current) and the turn-off decider 80 can be operated at 1.1V (that is, 110%).

Hereinafter, the operation of the driving signal generator 401 under the fixed frequency scheme and the fixed turn-off term scheme will be described in detail.

First, the current waveform of the driving coil L1 in each driving scheme will be described. According to the fixed frequency scheme, as can be seen in FIG. 12, there is a section where the turn-off decider 80 is not operated, and the operation frequency of the comparator 119 is increased. In addition, according to the fixed turn-off term scheme, as can be seen in FIGS. 13 and 14, the higher frequency operation is performed if the input voltage is high, and the lower frequency operation is performed if the input voltage is low.

According to the fixed frequency scheme, the driving signal generator 401 drives the power switch Q2 with the minimum pulse width in the first cycle of the input voltage and calculates the minimum operation term of the comparator 119 for measuring the gradient (which may be referred to as "a decider for adjusting the pulse width" according to the usage purpose of the decider) during the operation term of the comparator 119 (that is, the maximum gradient of the current of the power switch Q2 is measured).

In the second cycle of the input voltage, the new driving pulse width is calculated based on the minimum operation term, which is measured in the first cycle of the input voltage, thereby driving the power switch Q2. In the case of the circuit shown in FIG. 20, the power switch Q2 is driven with the value twice higher than the measured minimum value. If 80% of the reference voltage of the Zener diode ZD12 of the decider 119 for measuring the gradient is used, the power switch Q2 is driven with the value 1.25 times higher than the measured minimum value.

In addition, after the third cycle of the input voltage, the driving pulse width is slightly reduced (for instance: 1%) if the operation frequency of the pulse width adjustment decider 119 (that is, the gradient measurement comparator) is more than the reference level. And the driving pulse width is slightly increased (for instance: 1%) if the operation frequency of the pulse width adjustment decider 119 is less than the reference level, thereby driving the power switch Q2 (pulse width fine adjustment step).

Meanwhile, the current of the driving coil L1 is changed according to the variation of the input voltage in the fixed frequency scheme. In detail, if the input voltage is increased, as shown in FIG. 11, the operation frequency of the pulse width adjustment decider 119 is increased. In contrast, if the input voltage is decreased, as shown in FIG. 12, the operation frequency of the pulse width adjustment decider 119 is decreased. Of course, the operation frequency of the pulse width adjustment decider 119 may not vary if there is no variation in the input voltage.

Hereinafter, the operation of the driving signal generator 401 under the fixed turn-on term scheme will be described in detail. According to the fixed turn-on term scheme, as shown in FIGS. 15 and 16, the lower frequency driving is performed when the input voltage is high and the higher frequency driving is performed when the input voltage is low.

The turn-on term of the power switch Q2 is constant regardless of the level of the input voltage in the fixed turn-on term scheme. Thus, in the first cycle of the input voltage, the driving signal generator 401 drives the power switch Q2 with the maximum switch turn-off term and calculates the minimum operation term of the gradient measurement comparator 119 during the first cycle of the AC input (that is, the maximum gradient of the current of the power switch Q2 is measured).

In the second cycle of the input voltage, the new turn-off term is calculated based on the minimum operation term, which is measured in the first cycle of the input voltage, thereby driving the power switch Q2.

After the third cycle of the input voltage, similar to the fixed frequency/fixed turn-off term schemes, the turn-off term is finely adjusted according to the operation frequency of the gradient measurement comparator 119.

If there is a great difference between the lowest input voltage and the highest input voltage, the current flowing through the load/power switch Q2 may significantly vary. Thus, the turn-on term is divided into several levels in such a manner that the short turn-on term is used for the high input voltage and the long turn-on term is used for the low input voltage, thereby reducing the variation of the current flowing through the load/power switch Q2.

If the operation term of the gradient measurement comparator 119 is measured by a digital counter, the measurement resolution is determined depending on the counter clock. If the gradient measurement value of the power switch Q2 according to the input voltage has no discrimination due to the low resolution, the gradient measurement comparator 119 is preferably used only for counting the operation frequency. Since commercial power is 50 Hz or 60 Hz in most countries, it is enough if the driving signal of the power switch Q2 is changed once in the range of 10 ms to 20 ms, so the driving signal adjustment based on the operation frequency of the decider 119 can be realized by a microprocessor.

In FIG. 20, two terminals of the power switch Q2 are connected to the ground, in which the first terminal of the power switch Q2 is connected to the ground through the current detection resistor R1 and the second terminal is directly connected to the ground.

For instance, if the power switch Q2 is prepared as an FET (Field Effect Transistor), the FET has two source terminals, in which some current (for instance, 5%) flows to the first terminal and the remaining current (for instance, 95%) flows to the second terminal. Thus, the power consumed by the current detection resistor R1 may be reduced so that the power efficiency can be improved.

Similar to the first embodiment of the present invention, the pulse width controller (not shown, it may be integrally formed in the driving signal generator 401) includes a memory that stores information about the driving pulse width and the turn-off term corresponding to the minimum operation term and the operation frequency of the gradient measurement comparator 119. So the driving signal generator 401 can generate the driving signal according to driving signal information. In this case, if the pulse width controller is equipped with a programmable memory and a communication function for transmitting/receiving data to/from the external device, it is possible to program the driving signal information suitable for the load, such as the LED lamps.

Embodiment 3

Hereinafter, an active constant power supply apparatus according to the third embodiment of the present invention will be described in detail with reference to accompanying drawings.

Figure 21:
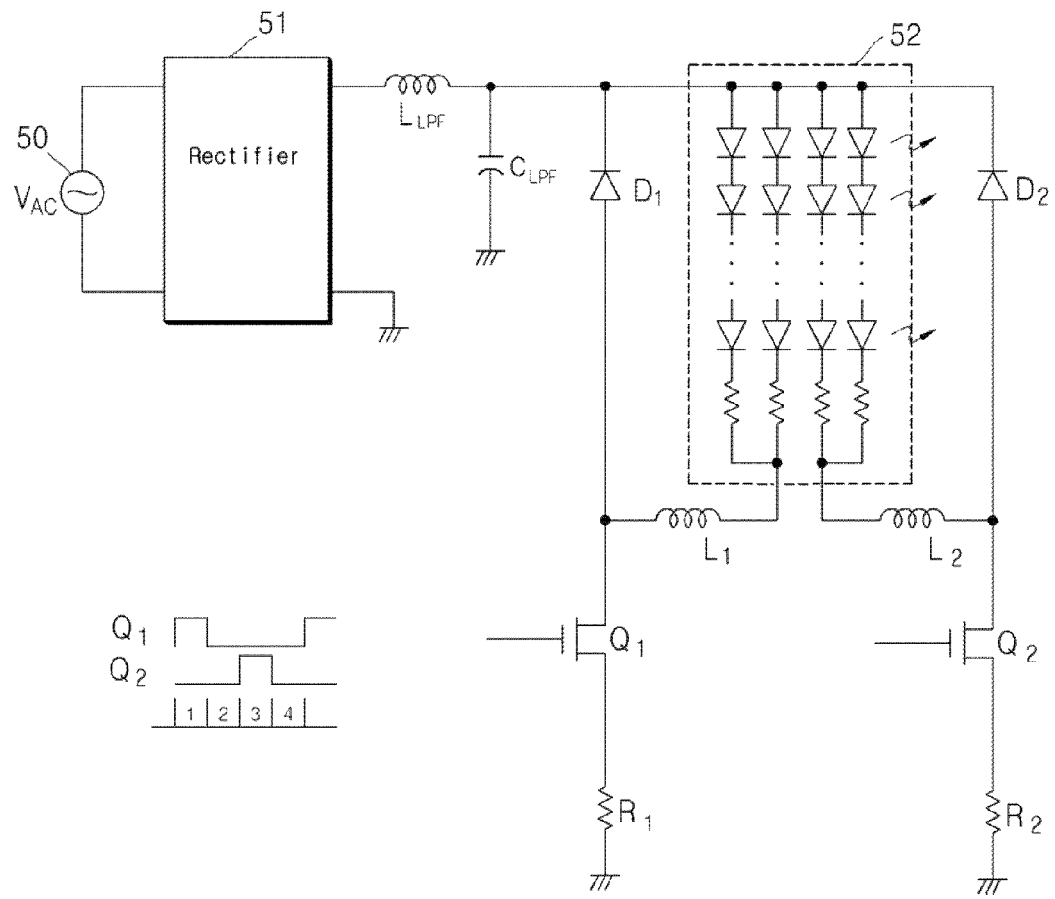
FIG. 21 is a schematic of an active constant power supply apparatus according to the third embodiment of the present invention.

FIG. 21 is a schematic of the active constant power supply apparatus according to the third embodiment of the present invention.

The third embodiment of the present invention has been suggested in order to more improve the THD (Total Harmonic Distortion). In detail, the simulation test A012 shown in FIGS. 18 and 19 represents the LED current of 20.4 mA and the power factor of 9.82, so it satisfies the KSC 7651, 7652, 7653 and 7654 requiring the power factor of 0.9 or above. However, the simulation test A012 does not satisfy the Class C standard in terms of the harmonic content because it represents the ninth harmonic of 9.9% (standard 5%) and the eleventh harmonic of 12.4% (standard 3%).

In this regard, according to the third embodiment of the present invention, the load 52 is divided into a plurality of loads and each load is driven with a predetermined time difference. Thus, in a view point of the power current, the driving frequency of the power current is increased and the lower frequency harmonic content, which may not be easily filtered, is shifted to the higher frequency region to remove the lower frequency harmonic content using a low pass filter, thereby improving the THD.

In addition, when manufacturing an LED lamp, the margin for the device value variation due to the distribution of the filter coil $L_{LPF}$ and the filter condenser $C_{LPF}$ can be increased. Further, during the operation, the margin for the device value variation due to the temperature variation can be increased.

Although FIG. 21 shows the load 52 divided into two loads and power switches Q1 and Q2 connected to the two loads, respectively, the present invention is not limited thereto. The load 52 can be divided into at least two loads and at least two power switches can be connected to the loads, respectively.

The computer simulation test A036 shown in FIG. 18 has been performed under the same conditions of the simulation test A012 except that the load 52 is divided into two loads and 640 uH coils L1 and L2, which are twice higher than pervious coils, are employed in the loads, respectively. As a result of the simulation test, the THD is improved from 18.2% to 8.5% (more than double), the current of the each LED is represented as 20.4 mA and 20.6 mA, in which the load current variation is 1% or less, the power factor is represented as 0.98 or above, and the current harmonic content satisfies the Class C standard.

Embodiment 4

Hereinafter, an active constant power supply apparatus according to the fourth embodiment of the present invention will be described in detail with reference to accompanying drawings.

Figure 22:
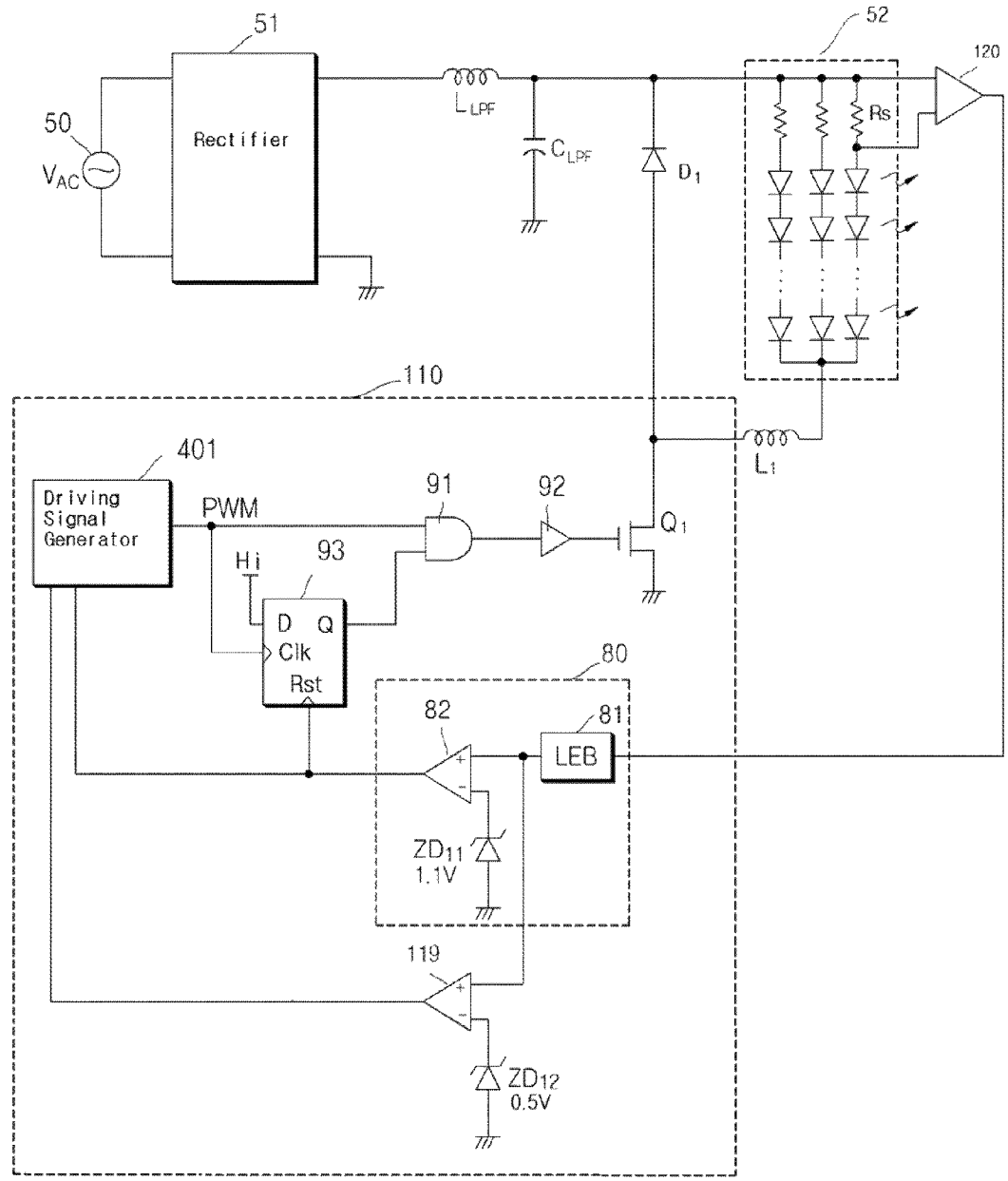
FIG. 22 is a schematic of an active constant power supply apparatus according to the fourth embodiment of the present invention.

FIG. 22 is a schematic of the active constant power supply apparatus according to the fourth embodiment of the present invention. When comparing with FIG. 20 showing the second embodiment of the present invention, a detection resistor Rs is inserted into a current loop including a load 52, a driving coil L1 and a free-wheeling diode D1.

That is, according to the previous embodiments, the current flowing through the load 52 is anticipated by detecting the current flowing through the power switch Q1. However, according to the fourth embodiment of the present invention, the current flowing through the load 52 is directly measured and the measurement value is supplied to the control circuit.

Referring to FIG. 22, the voltage at both terminals of the current detection resistor Rs is measured by a differential amplifier 120 to control the driving pulse width. And other circuit operations have already been described above.

Meanwhile, according to the fourth embodiment of the present invention, since the current flowing through the load 52 is directly measured and the measurement value is supplied to the control circuit, the current variation of the load 52 caused by aging characteristics (for instance, dust accumulation, temperature/humidity variation, etc.) of the driving coil value during the circuit operation can be prevented. In addition, the current flowing through the load 52 can be precisely measured even if the next switching cycle is started (Continuous Current Mode: CCM) before the energy charged in the driving coil L1 is completely discharged.

In addition, according to the related art, the detection resistor R1 (installed at a lower end of the power switch Q1) requires the low resistance value and high power, so the physical size of the detection resistor R1 is enlarged, and a great amount of heat is generated at the detection resistor R1. Further, it is difficult to acquire a standard type of the detection resistor R1 from market. However, according to the present invention, the detection resistor Rs has the high resistance value and low power, so inexpensive standard products can be easily obtained from market.

Experimental Example 2

Hereinafter, experimental example 2 of the active constant power supply apparatus according to the present invention will be described in detail.

Experimental example 2 has been performed to examine the usable level of the voltage at both terminals of the load based on the level of the input voltage. The circuit shown in FIG. 20 is used in experimental example 2 and the result is shown in FIGS. 23 and 24.

The voltage at both terminals of the load is 50.3V (at 20 mA). And the load is divided into two loads witch were driven by separate power switches Q1 and Q2. In addition, each of the two power switches Q1 and Q2 drives 10 LED strings with 100 KHz at the time difference of 5 μs. The filter coil $L_{LPF}$ is set to 1 mH. And the filter condenser $C_{LPF}$ is set to 0.1 uF. Further, the driving coil L1 is set to 360 uH, (720 uH in simulation test D010).

Referring to FIG. 23, in simulation test D002, the voltage at both terminals of the load is about a half of the input voltage and the remaining voltage is applied to the driving coil L1, in which the power factor is 0.946. If the input voltage is increased, the power factor is increased as the proportion of the voltage at both terminals of the load is lowered. The first phase angle is changed from 0.4° to 1.3°, that is, the current phase becomes fast, and the variation of the effective current of each LED is 4% or less in the range of 17.7 mA and 18.4 mA.

The harmonic content in the power current is shown in FIG. 24. In the case of simulation test D002 using 50% of the input voltage, the third harmonic is 32.7% (reference: 28.4%) and the ninth harmonic is 6.7% (reference: 5%), which deviate from the IEC 1000-3-2 Class C standard.

However, since the reference of the third harmonic is 86% and the reference of the ninth harmonic is 61% in the IEC 1000-3-2 Class D standard (hereinafter, referred to as Class D standard) applied to 25 watt or less, the harmonic content satisfies the Class D standard.

In the case of simulation test D003 using the load having the level of 45% of the input voltage, the fifth harmonic exceeds the Class C standard by 0.1%. Simulation test D004 using the load having the level of 40% of the input voltage satisfies the Class C standard. In the case of simulation test D005 using the load having the level of 35% of the input voltage, the thirteenth harmonic exceeds the Class C standard by 0.6%. In the case of simulation test D006 using the load having the ⅓ level of the input voltage, the eleventh harmonic exceeds the Class C standard by 0.2%. The above problem can be solved by changing the filter time constant, the driving coil value, or the driving frequency.

Consequently, if an LED lamp having the power less than 25 watt uses 50% or less of the input voltage, the constant power supply apparatus having the power factor of 0.9 or above and satisfying the Class D standard can be provided. At this time, the maximum duty ratio of the driving pulse is 50%. In addition, if an LED lamp having the power of 25 watt or above uses 45% or less of the input voltage, the constant power supply apparatus having the power factor of 0.9 or above and satisfying the Class C standard can be provided. At this time, the maximum duty ratio of the driving pulse is 45%.

Hereinafter, the calculation method useful in the present invention will be described.

Calculation Method Summary—Experimental Formula—Calculation Method for Driving Coil Value The calculation method for the driving coil value is equal to the calculation method for the resistance value. For instance, in FIG. 18, simulation test A036 has been performed by dividing the load used in simulation test A012 into two loads. Since the current is reduced by a half in view of the driving coil L1, the driving coil value is increased by two times.

Table 1 illustrates the values of the driving coil L1 according to the number of LED arrays connected in parallel when the current of each LED is set to 20 mA.

TABLE 1

| Number of LED arrays | Maximum instantaneous current of power switch (A) | Driving coil value (mH) |
|---|---|---|
| 1 | 0.06 | 12.80 |
| 10 | 0.6 | 1.280 |
| 20 | 1.2 | 0.640 |
| 40 | 2.4 | 0.320 |
| 80 | 4.8 | 0.160 |

Calculation method for driving pulse width when voltage at both terminal of load is changed The charge time of the driving coil L1 may vary depending on the input voltage. For instance, if the voltage at both terminals of the driving coil L1 is increased by two times, the charge time may be reduced by a half. That is, if the voltage VF1 at both terminals of the load and the charge time PW1 are provided, unknown charge time PW2 depending on the new voltage VF2 at both terminals of the load can be obtained through the following formula 1.

$$PW2 = (VDC - VF1)/(VDC - VF2) \times PW1 \qquad \text{Formula 1}$$

(VDC=maximum rectifying voltage)

The above calculation method can be used to calculate the pulse width when the input voltage is changed in the circuit and the number of LEDs connected in series is changed.

Calculation method for driving frequency when number of LEDs connected in series is changed (for fixed frequency scheme and fixed turn-off term scheme)

If the voltage at both terminals of the load and the voltage at both terminals of the driving coil L2 are changed and the maximum rectifying voltage is not changed, then the charge/discharge time of the driving coil L1 is changed. If the known voltage VF1 at both terminals of the load and the discharge time Tdis1 are provided, unknown discharge time Tdis2 depending on the new voltage VF2 at both terminals of the load can be obtained through the following formula 2.

$$Tdis2 = VF1/VF2 \times Tdis1 \qquad \text{Formula 2}$$

The new driving period is the sum of the charge time PW2 and the discharge time Tdis2.

FIG. 25 shows the calculation result for the driving pulse width and the voltage at both terminals of the load when the number of LEDs connected in series is changed. In FIG. 25, the driving pulse width and the discharge end time with respect to the load voltage of 50.3V have already been calculated in simulation tests A016 (for 370V) and A029 (for 250V), and remaining values are calculated according to the above formulas. In the case of load voltages of 24.2V and 12.3V, the calculation result and the simulation test result are simultaneously expressed.

If the target designed load voltage and current have been determined, then the driving coil value and the driving frequency can be easily set, according to the above calculation method.

Hereinafter, a semiconductor integrated device according to the exemplary embodiment of the present invention will be described with reference to FIG. 26.

Figure 26:
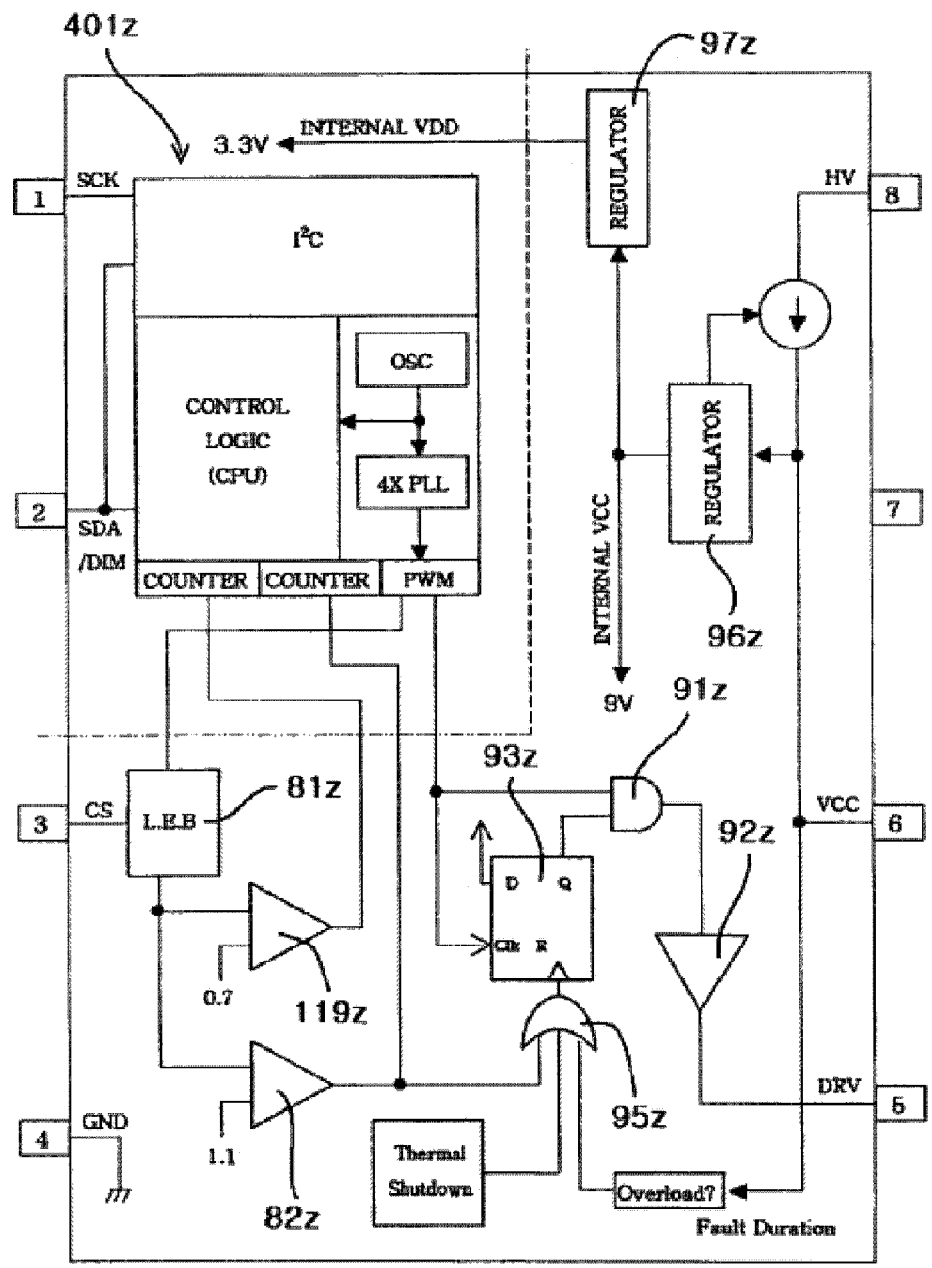
FIG. 26 is a view showing a semiconductor integrated device according to one embodiment of the present invention.

Referring to FIG. 26, the semiconductor integrated device mainly consists of two parts of an analog circuit and a driving signal generator 401z. The analog circuit includes a power switch driver 92z, a peak voltage remover 81z, a turn-off decider 82z operating when a surge current flows, and a pulse width control decider 119z. The driving signal generator 401z is a digital circuit including a counter for counting the operation frequency of the deciders, a signal generator PWM for controlling the on/off operation of a power switch, a control logic CPU for controlling the pulse width control decider such that the operation frequency of the pulse width control decider can be set within the predetermined range, and a communication circuit I²C communicating with external devices.

In addition, a regulator is provided in each circuit to supply constant voltage. A regulator 96z supplies the constant voltage of 9V to the analog circuit. If the power switch is a MOSFET, the regulator preferably supplies the constant voltage in the range of 5V to 20V. In addition, a regulator 97z supplies the constant voltage of 3.3V to the digital circuit. Preferably, the regulator 97z supplies the constant voltage less than 5V in order to allow the driving signal generator 401z to be operated at 20 MHz or above. The reference voltages of the deciders 82z and 119z are set to 1.1V and 0.7V, respectively, which signifies 110% and 70% of the design reference value for the purpose of convenience of explanation. The reference voltage is preferably set to 1V or below in the actual integrated device.

Hereinafter, the function of each pin will be described.

First, a first pin SCK and a second pin SDA/DIM make communication with external devices through the I²C scheme. In particular, the second pin SDA/DIM serves as an external dimming signal input pin. That is, if a signal is input into the second pin SDA/DIM in a state that there is no clock signal in the first pin SCK, the second pin SDA/DIM operates as the dimming signal input pin. In addition, a third pin CS is a terminal to measure the current flowing through the switch, a fourth pin GND is a grounding terminal, and a fifth pin DRV is a terminal to drive the power switch. An eighth pin HV is a terminal connected to a rectifying voltage terminal or an external power supply. The current controlled by the constant voltage regulator $96z$ is charged in the capacitor installed out of a sixth pin VCC to serve as a power bank of the operating voltage for the semiconductor device. Detailed description about the above pins will be omitted because it is generally known in the art.

Figure 27:
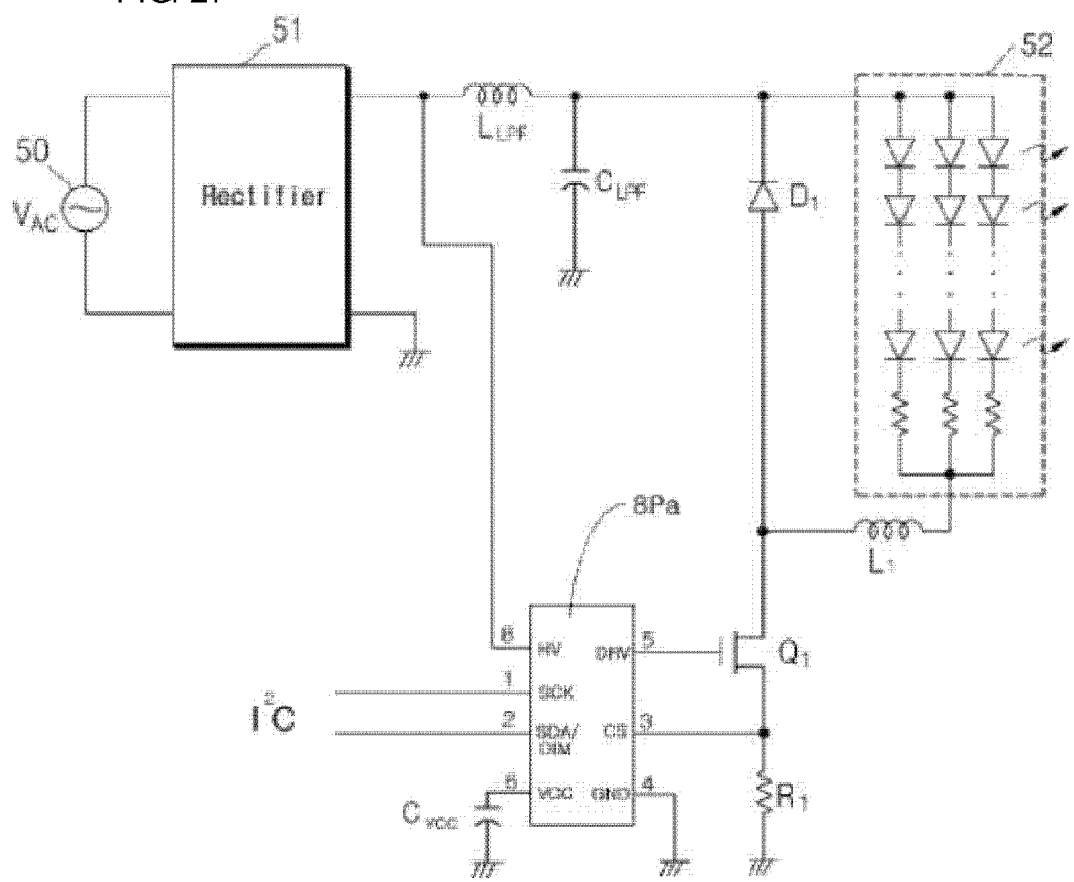
FIG. 27 is a view showing a first example of an actual application circuit prepared by using the semiconductor integrated device shown in FIG. 26.

FIG. 27 is a view showing an actual application circuit prepared by using the semiconductor integrated circuit 8 Pa shown in FIG. 26. In the circuit shown in FIG. 27, the semiconductor integrated circuit 8 Pa is preferably operated as follows.

In Case of Fixed Frequency Scheme

1. The signal generator PWM is set with a minimum pulse width. The signal generator PWM continuously drives the switch with the preset frequency/pulse width.

2. The counter is reset.
A counter counting the operation frequency of the pulse width control decider.
A counter counting the operation frequency of the turn-off decider operated when the surge current flows.

3. Wait for one period of the rectifying voltage.

4. Check the operation of the protective circuit.
If the operation frequency of the turn-off decider is 4 or less, step 5 is performed (4 or less—surge input, 5 or above-pulse width is too wide).

4.1. If there is a minimum pulse width allowed by the control logic, it is determined that over-voltage exceeding the design value has been input, so the signal generator PWM is set such that the driving frequency is reduced to ½ (skip mode) and step 2 is performed.

4.2. Since the pulse width is wide without the surge input, the signal generator PWM is set by reducing the pulse width in the unit of 2 or more and step 2 is performed.

5. The operation frequency of the pulse width control decider is checked.

5.1. If the operation frequency is less than the predetermined value (target value), the signal generator PWM is set by increasing the pulse width in the unit of 1 and step 2 is performed.

5.2. If the operation frequency is more than the predetermined value (target value), the signal generator PWM is set by reducing the pulse width in the unit of 1 and step 2 is performed.

5.1. If the operation frequency is within the predetermined range, the pulse width control decider has a continuously operating period and a non-continuously operating period, and the intermediate section of the above periods is the zero crossing point of the instantaneous maximum rectifying voltage and AC input voltage, so it is waited until the zero crossing point reaches (synchronization step—optional step). At this time, if the switch driving pulse width is properly converted, the input voltage can be achieved (that is, the pulse width is obtained by analog-digital converting the input voltage) and step 2 is performed.

Figure 28:
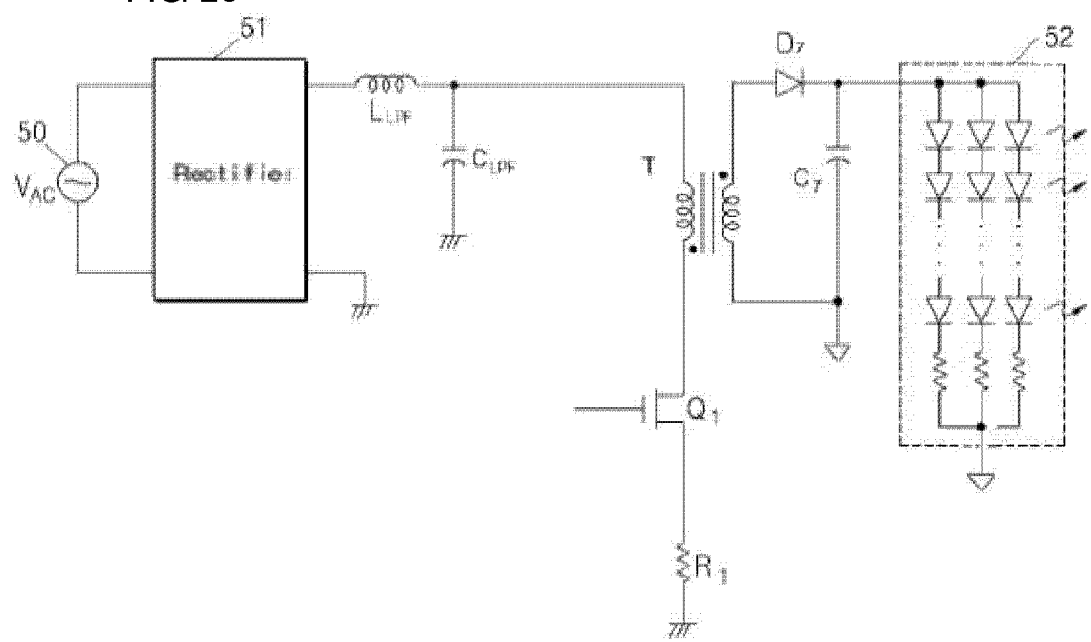
FIG. 28 is a view showing a second example of an actual application circuit prepared by using the semiconductor integrated device shown in FIG. 26.

In addition, if a coil is prepared as a device having an inductance component as a main component, the coil can be applied to a flyback converter or a forward converter employing a transformer. In this case, the controller of the present invention may serve as a power factor correction (PFC) controller. FIG. 28 is a view showing one example of the flyback converter employing the concept of the present invention.

The exemplary embodiments of the present invention have been described above.

According to the embodiments of the present invention, the energy charged in the driving coil is completely discharged in each switching cycle. If the next switching cycle starts before the energy is completely discharged, the energy remaining in the previous cycle is added to the energy of the present cycle, so that a greater amount of current may flow. Thus, the higher current can be supplied to the load.

In addition, all or a part of the constant power supply apparatus according to the exemplary embodiments of the present invention can be implemented as a monolithic semiconductor integrated device or a hybrid semiconductor integrated device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

A converter embedded LED lamp, which is called an LED fluorescent lamp or an LED glow lamp, used in the LED lighting industry, which is the new growth industry, is subject to the spatial restriction when installing a power source device. In addition, an additional circuit is required to improve the power factor. A valley fill circuit is generally known as the additional circuit to improve the power factor. The valley fill circuit requires two smoothing condensers and three rectifying diodes, but the maximum power factor is only about 0.92. In the case of the active type, the cost is expensive and the circuit is complicated.

However, according to the present invention, the main components used in the LED lighting industry, which is the new growth industry, can be provided without an extra circuit for improving the power factor, so the products manufactured according to the present invention may have the cost competitiveness.

What is claimed is:

1. An active constant power supply apparatus for supplying constant power to a load, the active constant power supply apparatus comprising:
   an AC power supplier for supplying AC power;
   a rectifying circuit which receives the AC power from the AC power supplier and rectifies the received AC power;
   a driving coil connected in series to the load receiving power from the rectifying circuit;
   a power switch for switching on/off a current passing through the driving coil and the load;
   a free-wheeling diode, both ends of which are connected to an outer terminal and an input terminal of the load, respectively, so that the free-wheeling diode is connected to the load in parallel, the free-wheeling diode being installed such that the current flows from the output terminal of the load to the input terminal of the load to discharge the current charged in the driving coil to the load when the power switch is switched off;

a pulse-type driving signal generator connected to a gate terminal of the power switch to control the switching on/off operation of the power switch;

a turn-off decider which generates a turn-off signal when the current flowing along the driving coil has a value higher than a designed value, so as to switch off the power switch; and a pulse width controller which measures an adjustment term ranging from a switch-on time of the driving signal generator to a switch-off time of the turn-off decider in a unit of one period of a rectifying voltage while the power is being supplied to the load to acquire and store a minimum adjustment term, and controls a driving pulse width of the driving signal generator such that the driving pulse width coincides with the adjustment term in and after a next cycle of power supply, wherein the pulse width controller includes a pulse width measurement comparator (or a pulse width adjustment decider), a start point is set as a time at which the current flowing through the driving coil is 0 A, an end point is set as a time during which the pulse width measurement comparator is operated in a level less than the designed value, and the pulse width controller measures a gradient of the current flowing through the driving coil based on the start point and the end point and sets the adjustment term according to the gradient of the current or sets the adjustment term such that the pulse width measurement comparator has a predetermined frequency of operations.

2. The active constant power supply apparatus of claim 1, wherein a start point is set as a time at which the current flowing through the driving coil is 0 A, an end point is set as a time during which the turn-off decider is operated with the designed value, and the pulse width controller sets the adjustment term as a time ranging from the start point to the end point.

3. The active constant power supply apparatus of claim 1, wherein the pulse width controller controls the driving signal generator in a fixed frequency scheme, in such a manner that a frequency of the driving signal generator is fixed and the current charged in the driving coil is completely discharged within one period of the frequency.

4. The active constant power supply apparatus of claim 1, wherein the pulse width controller controls the driving signal generator in a fixed turn-off scheme or fixed turn-off term scheme (fixed discharge term scheme) in such a manner that a next driving pulse is generated just after the current charged in the driving coil is completely discharged.

5. The active constant power supply apparatus of claim 1, wherein the pulse width controller fixes the driving pulse width such that a charge time of the driving coil becomes constant, controls the driving signal generator in such a manner that a next driving pulse is generated just after the current charged in the driving coil is completely discharged when an input power having a lowest value is supplied to the load, and controls the driving signal generator in a fixed turn-off scheme or fixed turn-off term scheme (fixed discharge term scheme) in such a manner that a next driving pulse is generated with a predetermined turn-off term after the current charged in the driving coil is completely discharged when an input power having a highest value is supplied to the load.

6. The active constant power supply apparatus of claim 1, wherein the pulse width controller comprises:

a microprocessor calculating the adjustment term;

a timer measuring the switching-on time of the driving signal generator and the switching-off time of the turn-off decider and supplying data thereof to the microprocessor; and a memory storing the adjustment term calculated by the microprocessor, wherein the pulse width controller further comprises a communication module for making communication with an external device.

7. The active constant power supply apparatus of claim 1, wherein the load includes at least one light emitting diode string, and constant power is supplied to the at least one light emitting diode string at a predetermined time interval.

8. The active constant power supply apparatus of claim 2, wherein the pulse width controller controls the driving signal generator in a fixed frequency scheme, in such a manner that a frequency of the driving signal generator is fixed and the current charged in the driving coil is completely discharged within one period of the frequency.

9. The active constant power supply apparatus of claim 2, wherein the pulse width controller controls the driving signal generator in a fixed turn-off scheme or fixed turn-off term scheme (fixed discharge term scheme) in such a manner that a next driving pulse is generated just after the current charged in the driving coil is completely discharged.

10. The active constant power supply apparatus of claim 2, wherein the pulse width controller fixes the driving pulse width such that a charge time of the driving coil becomes constant, controls the driving signal generator in such a manner that a next driving pulse is generated just after the current charged in the driving coil is completely discharged when an input power having a lowest value is supplied to the load, and controls the driving signal generator in a fixed turn-off scheme or fixed turn-off term scheme (fixed discharge term scheme) in such a manner that a next driving pulse is generated with a predetermined turn-off term after the current charged in the driving coil is completely discharged when an input power having a highest value is supplied to the load.

11. The active constant power supply apparatus of claim 2, wherein the pulse width controller comprises:

a microprocessor calculating the adjustment term;

a timer measuring the switching-on time of the driving signal generator and the switching-off time of the turn-off decider and supplying data thereof to the microprocessor; and a memory storing the adjustment term calculated by the microprocessor, wherein the pulse width controller further comprises a communication module for making communication with an external device.

12. The active constant power supply apparatus of claim 2, wherein the load includes at least one light emitting diode string, and constant power is supplied to the at least one light emitting diode string at a predetermined time interval.

\* \* \* \* \*